United States Patent
Tomioka

(10) Patent No.: US 9,323,031 B2
(45) Date of Patent: Apr. 26, 2016

(54) IMAGING LENS AND IMAGING APPARATUS

(71) Applicant: FUJIFILM Corporation, Tokyo (JP)

(72) Inventor: Ukyo Tomioka, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 44 days.

(21) Appl. No.: 14/507,863

(22) Filed: Oct. 7, 2014

(65) Prior Publication Data

US 2015/0022908 A1   Jan. 22, 2015

Related U.S. Application Data

(63) Continuation of application No. PCT/JP2013/002355, filed on Apr. 5, 2013.

(30) Foreign Application Priority Data

Apr. 9, 2012 (JP) ................. 2012-088063

(51) Int. Cl.
  *G02B 13/04* (2006.01)
  *G02B 9/64* (2006.01)
  *G02B 13/00* (2006.01)

(52) U.S. Cl.
  CPC ..... *G02B 13/04* (2013.01); *G02B 9/64* (2013.01); *G02B 13/0045* (2013.01)

(58) Field of Classification Search
  CPC ........................................ G02B 13/04
  USPC ........................................ 359/751
  See application file for complete search history.

(56) References Cited

U.S. PATENT DOCUMENTS

| 4,256,373 A | 3/1981 | Horimoto |
| 5,434,713 A | 7/1995 | Sato |
| 5,861,999 A | 1/1999 | Tada |
| 2011/0249349 A1* | 10/2011 | Asami .............. G02B 9/62 359/797 |

FOREIGN PATENT DOCUMENTS

| JP | 54-32319 | 3/1979 |
| JP | 61-123810 | 6/1986 |
| JP | 02-248910 | 10/1990 |
| JP | 04-218012 | 8/1992 |

(Continued)

OTHER PUBLICATIONS

International Search Report PCT/JP2013/002355 dated Jul. 30, 2013.

*Primary Examiner* — James Jones
(74) *Attorney, Agent, or Firm* — Young & Thompson

(57) ABSTRACT

An imaging lens consists essentially of a front-group consisting of a first lens having a negative meniscus shape with its convex surface facing an object side, a second lens having negative refractive power, a third lens having positive refractive power, a fourth lens having a negative meniscus shape with its concave surface facing an image side and a fifth lens having positive refractive power, and the front-group having positive refractive power as a whole, a stop, and a rear-group consisting of a sixth lens having positive refractive power and a seventh lens having a negative meniscus shape with its concave surface facing the object side, and the rear-group having positive refractive power as a whole, in this order from the object side. A predetermined conditional formula about a combined focal length of the first lens and the second lens, and a focal length of an entire system is satisfied.

17 Claims, 22 Drawing Sheets

(56) References Cited

FOREIGN PATENT DOCUMENTS

| | | |
|---|---|---|
| JP | 05-273459 | 10/1993 |
| JP | 05-323183 | 12/1993 |
| JP | 11-142730 | 5/1999 |
| JP | 2000-019391 | 1/2000 |
| JP | 3062735 | 7/2000 |
| JP | 2011-237750 | 11/2011 |

* cited by examiner

EXAMPLE 4

IMAGING LENS AND IMAGING APPARATUS

CROSS-REFERENCE TO RELATED APPLICATIONS

This application is a Continuation of PCT International Application No. PCT/JP2013/002355 filed on Apr. 5, 2013, which claims priority under 35 U.S.C. §119(a) to Japanese Patent Application No. 2012-088063 filed on Apr. 9, 2012. Each of the above applications is hereby expressly incorporated by reference, in its entirety, into the present application.

BACKGROUND OF THE INVENTION

1. Field of the Invention

The present invention relates to an imaging lens used in an electronic camera, such as a digital camera, a video camera, a surveillance camera and an in-vehicle camera, and to an imaging apparatus on which the imaging lens is mounted.

2. Description of the Related Art

As an imaging lens consisting of a negative lens unit consisting of only a lens or lenses having negative refractive power and a positive lens unit arranged toward an image side of the negative lens unit, and which has positive refractive power, in this order from an object side, imaging lenses disclosed in Japanese Unexamined Patent Publication No. 2000-019391 (Patent Document 1), Japanese Patent No. 3062735 (Patent Document 2), Japanese Unexamined Patent Publication No. 11(1999)-142730 (Patent Document 3), Japanese Unexamined Patent Publication No. 2011-237750 (Patent Document 4), and Japanese Unexamined Patent Publication No. 5(1993)-323183 (Patent Document 5) have been proposed.

SUMMARY OF THE INVENTION

In the imaging lens disclosed in Patent Document 1, various aberrations are excellently corrected, but an F-number is 3.2, which means a slow lens, and an angle of view is about 64°, which is not very wide. In the imaging lens disclosed in Patent Document 2, various aberrations are excellently corrected, and an angle of view is about 117°, which is wide. However, it is difficult to suppress the size of the imaging lens in total length. In the imaging lens disclosed in Patent Document 3, various aberrations are excellently corrected, but an angle of view is 80° or less, which is not very wide. The imaging lens disclosed in Patent Document 4 is in small size, and an F-number is about 1.8, which means a fast lens. However, an angle of view is 40° or less, which is not wide. In the imaging lens disclosed in Patent Document 5, an angle of view is 131° or more, which is wide. However, a total length is long, and the imaging lens is not a fast lens.

In view of the foregoing circumstances, it is an object of the present invention to provide an imaging lens, the total length of which is short, and the size of which is small, and which is a fast lens with a wide angle of view and excellent optical performance.

An imaging lens of the present invention consists essentially of a front group consisting of a first lens having a negative meniscus shape with its convex surface facing an object side, a second lens having negative refractive power, a third lens having positive refractive power, a fourth lens having a negative meniscus shape with its concave surface facing an image side and a fifth lens having positive refractive power, and the front group having positive refractive power as a whole, a stop, and a rear group consisting of a sixth lens having positive refractive power and a seventh lens having a negative meniscus shape with its concave surface facing the object side, and the rear group having positive refractive power as a whole, in this order from the object side. Further, the following conditional formula (1) is satisfied:

$$0.6 < |f12|/f < 1.5 \qquad (1), \text{where}$$

f12: a combined focal length of the first lens and the second lens, and f: a focal length of an entire system.

The imaging lens of the present invention consists essentially of seven lenses of the first lens through the seventh lens and the stop. However, the imaging lens may include a lens or lenses substantially without refractive power, an optical element, such as a cover glass, other than the lenses, a mechanism part, such as a lens flange, a lens barrel, an imaging device and a hand shake blur correction mechanism, and the like besides the seven lenses.

Further, in the present invention, the shape of a lens surface, such as a convex surface, a concave surface, a flat surface, biconcave, meniscus, biconvex, plano-convex and plano-concave, and the sign of refractive power of a lens, such as positive and negative, are considered in a paraxial region when an aspherical surface is included, unless otherwise mentioned. In the present invention, the sign of a curvature radius is positive when a surface shape is convex toward the object side, and negative when a surface shape is convex toward the image side.

It is desirable that the imaging lens of the present invention satisfies the following conditional formula (1-1) or (1-2):

$$0.7 < |f12|/f < 1.3 \qquad (1\text{-}1); \text{ or}$$

$$0.8 < |f12|/f < 1.2$$

In the imaging lens of the present invention, it is desirable that the following conditional formula (2) is satisfied:

$$1.3 < fa/f < 1.9 \qquad (2), \text{where}$$

fa: a focal length of the front group, and f: a focal length of an entire system.

In this case, it is more desirable that the following conditional formula (2-1) is satisfied:

$$1.4 < fa/f < 1.8 \qquad (2\text{-}1).$$

Further, in the imaging lens of the present invention, it is desirable that the following conditional formula (3) is satisfied:

$$0.5 < fa/f5 < 1.4 \qquad (3), \text{where}$$

fa: a focal length of the front group, and f5: a focal length of the fifth lens.

In this case, it is more desirable that the following conditional formula (3-1) or (3-2) is satisfied:

$$0.7 < fa/f5 < 1.3 \qquad (3\text{-}1); \text{ or}$$

$$0.8 < fa/f5 < 1.2 \qquad (3\text{-}2).$$

Further, in the imaging lens of the present invention, it is desirable that the following conditional formula (4) is satisfied:

$$vd3 < 26.0 \qquad (4), \text{where}$$

vd3: an Abbe number of the third lens for d-line.

In this case, it is more desirable that the following conditional formula (4-1) is satisfied:

$$vd3 < 23.0 \qquad (4\text{-}1).$$

Further, in the imaging lens of the present invention, it is desirable that the following conditional formula (5) is satisfied:

$$3.5 < L/Rr1 < 9.0 \quad (5),$$

where

L: a length from a vertex of an object-side surface of the first lens to a paraxial image formation position determined by the first lens through the seventh lens, and Rr1: a paraxial curvature radius of an image-side surface of the first lens.

In this case, it is more desirable that the following conditional formula (5-1) is satisfied:

$$4.0 < L/Rr1 < 7.0 \quad (5\text{-}1).$$

Further, in the imaging lens of the present invention, it is desirable that the following conditional formula (6) is satisfied:

$$3.5 < L/Rr2 < 10.0 \quad (6),$$

where

L: a length from a vertex of an object-side surface of the first lens to a paraxial image formation position determined by the first lens through the seventh lens, and Rr2: a paraxial curvature radius of an image-side surface of the second lens.

In this case, it is more desirable that the following conditional formula (6-1) is satisfied:

$$4.5 < L/Rr2 < 9.0 \quad (6\text{-}1).$$

Further, in the imaging lens of the present invention, it is desirable that the following conditional formula (7) is satisfied:

$$0.4 < f5/f6 < 1 \quad (7),$$

where f5: a focal length of the fifth lens, and f6: a focal length of the sixth lens.

In this case, it is more desirable that the following conditional formula (7-1) is satisfied:

$$0.55 < f5/f6 < 0.85 \quad (7\text{-}1).$$

An imaging apparatus of the present invention is an imaging apparatus on which the imaging lens of the present invention, as described above, is mounted.

According to the present invention, the imaging lens consists essentially of a front group consisting of a first lens having a negative meniscus shape with its convex surface facing an object side, a second lens having negative refractive power, a third lens having positive refractive power, a fourth lens having a negative meniscus shape with its concave surface facing an image side and a fifth lens having positive refractive power, and the front group having positive refractive power as a whole, a stop, and a rear group consisting of a sixth lens having positive refractive power and a seventh lens having a negative meniscus shape with its concave surface facing the object side, and the rear group having positive refractive power as a whole, in this order from the object side. Further, conditional formula (1) is satisfied. Therefore, the imaging lens with a short total length and in small size is structurable. Further, the imaging lens is structurable as a fast lens with a wide angle of view and excellent performance.

The imaging apparatus of the present invention includes the imaging lens of the present invention. Therefore, it is possible to structure the imaging apparatus in small size and with excellent optical performance. The imaging apparatus can obtain excellent images by using an imaging device.

DESCRIPTION OF THE PREFERRED EMBODIMENTS

Figure 1:
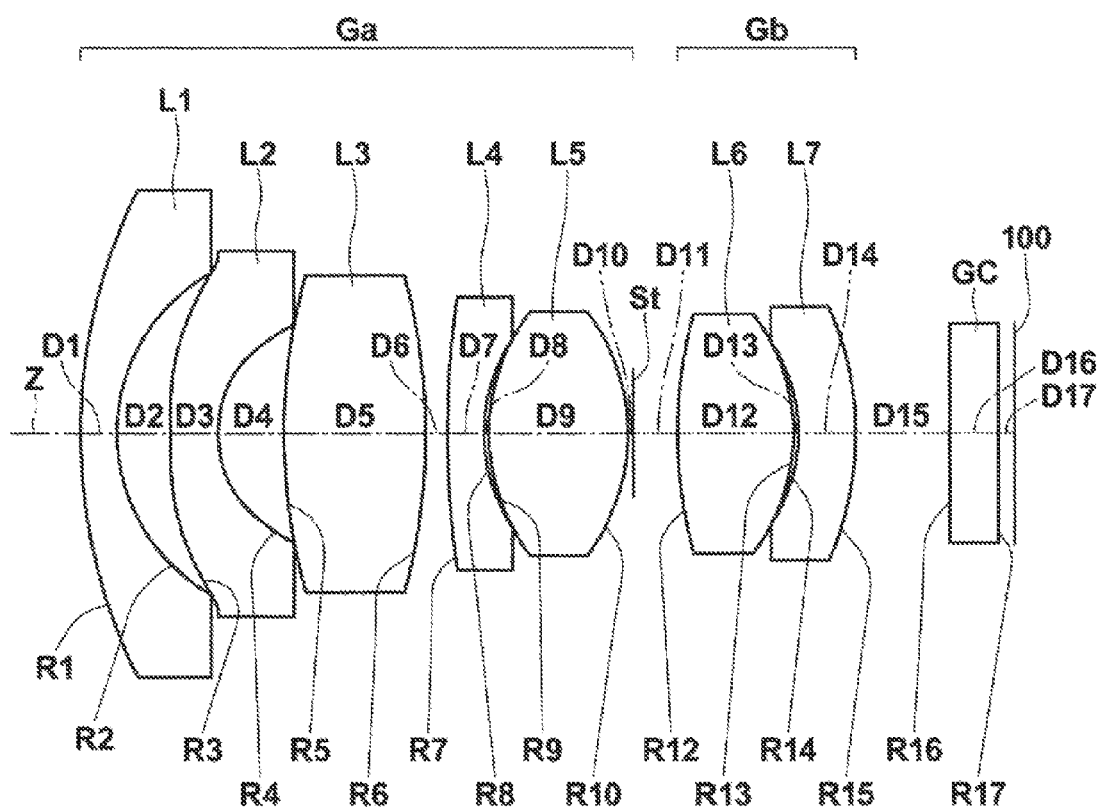
FIG. 1 is a cross section illustrating the lens structure of an imaging lens in Example 1 of the present invention.
Figure 2:
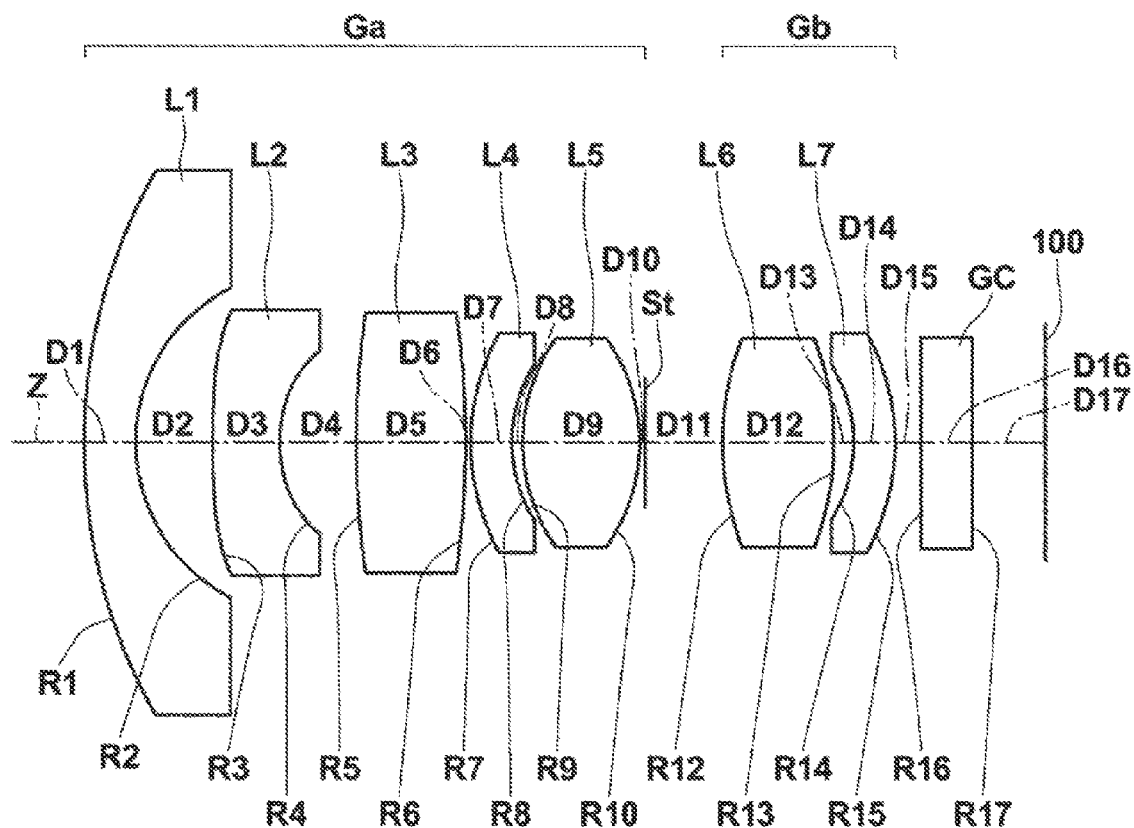
FIG. 2 is a cross section illustrating the lens structure of an imaging lens in Example 2 of the present invention.
Figure 3:
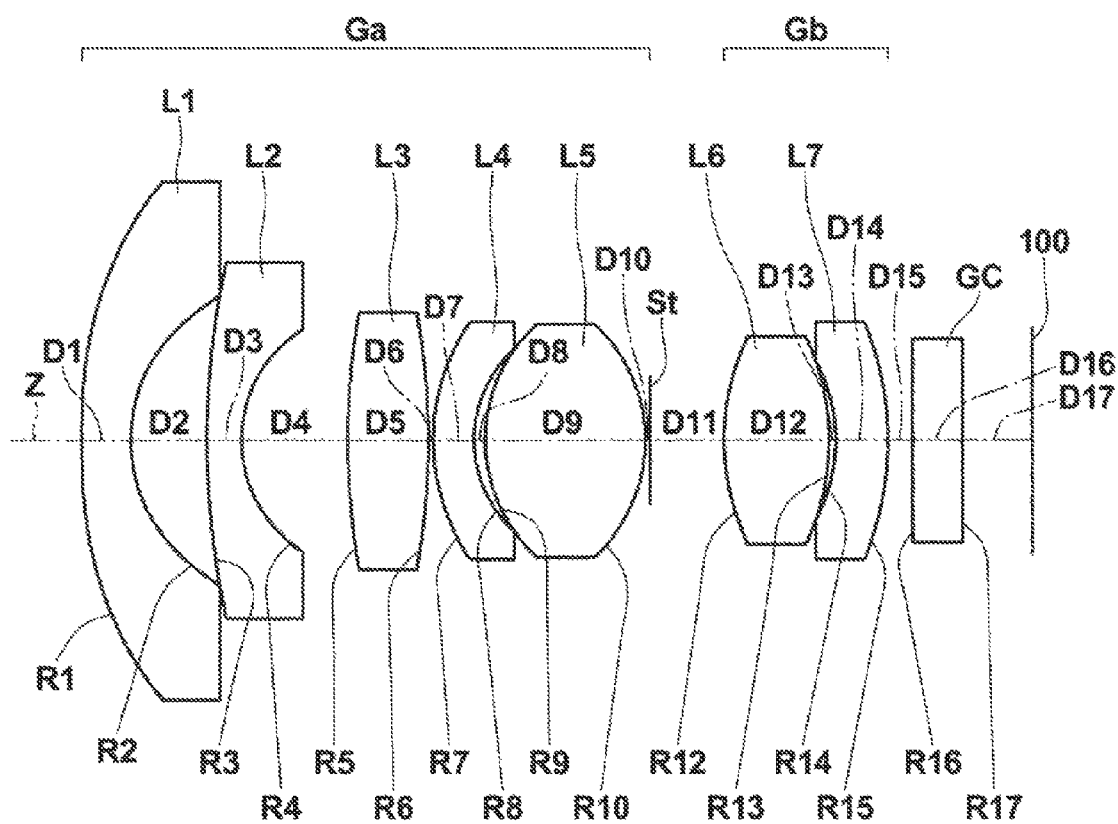
FIG. 3 is a cross section illustrating the lens structure of an imaging lens in Example 3 of the present invention.
Figure 4:
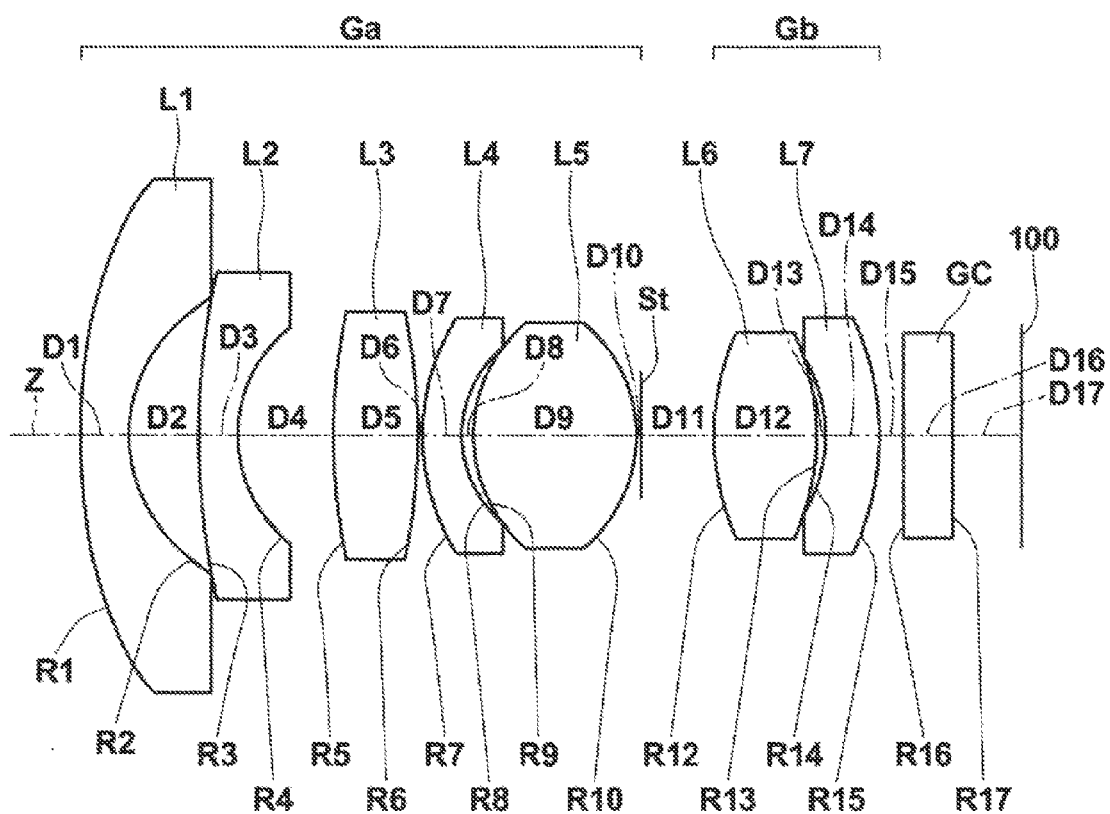
FIG. 4 is a cross section illustrating the lens structure of an imaging lens in Example 4 of the present invention.
Figure 5:
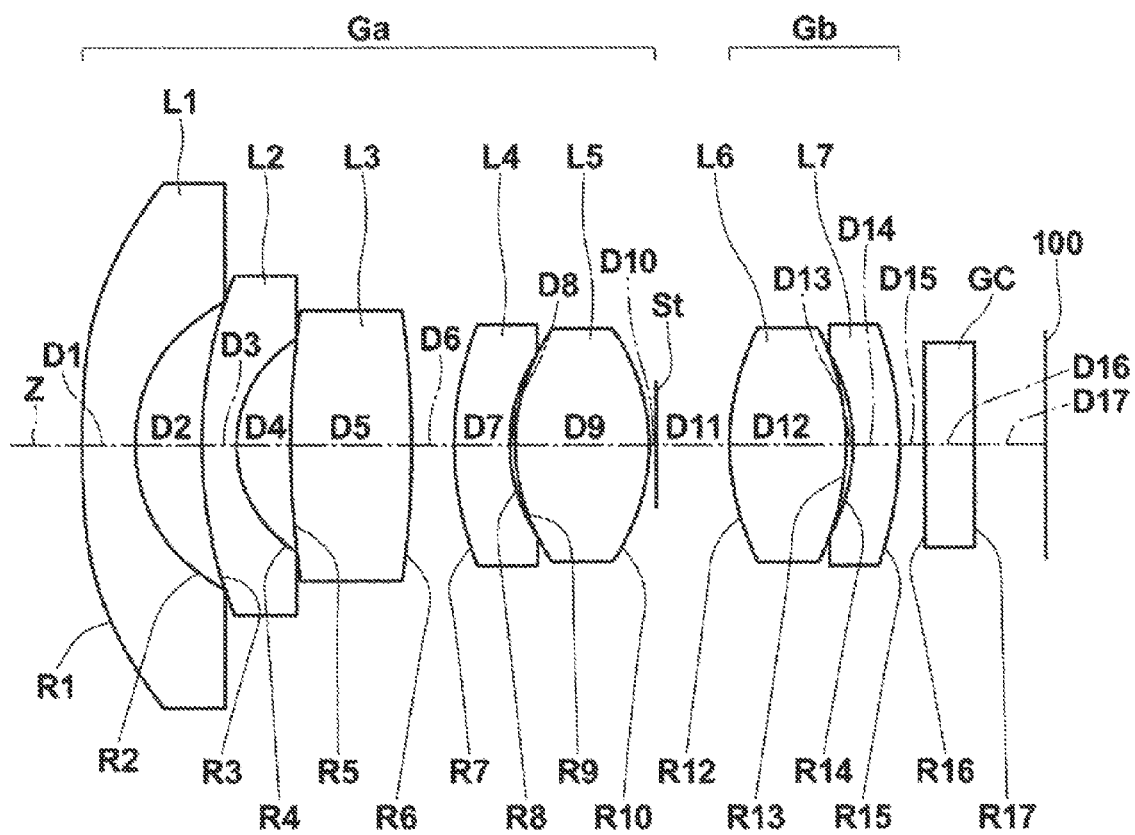
FIG. 5 is a cross section illustrating the lens structure of an imaging lens in Example 5 of the present invention.
Figure 6:
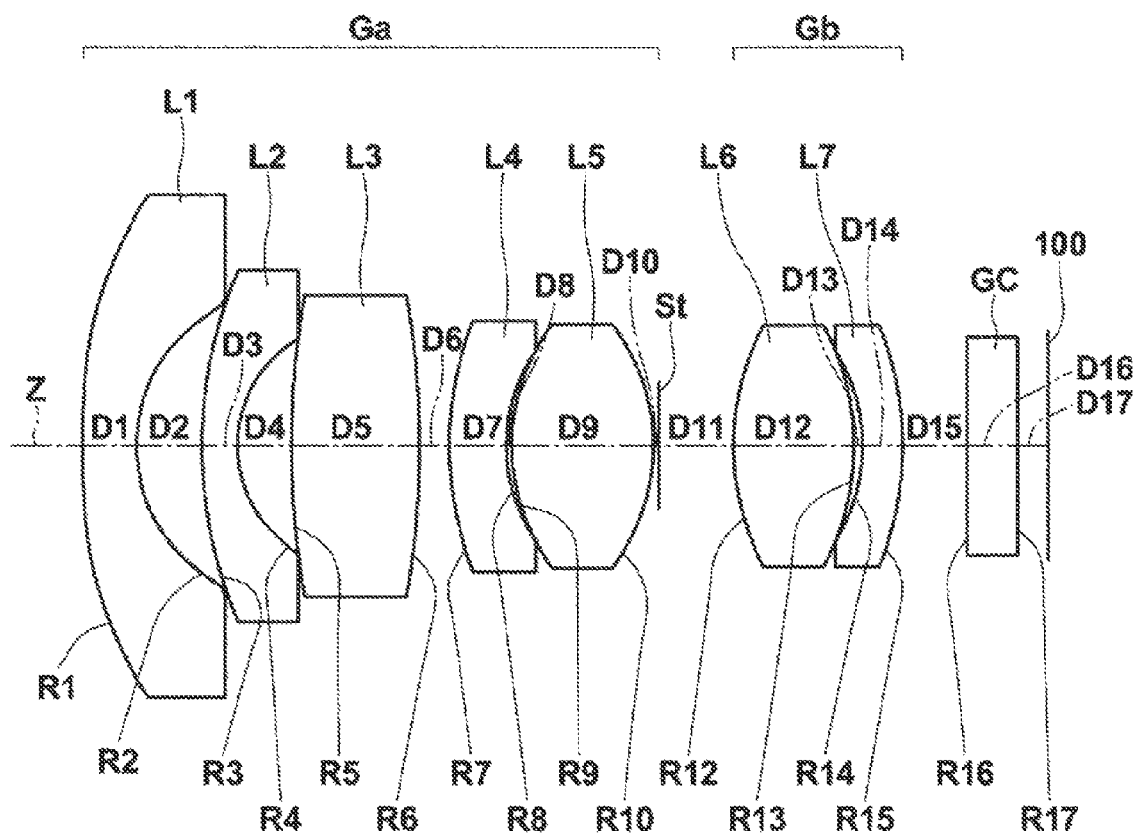
FIG. 6 is a cross section illustrating the lens structure of an imaging lens in Example 6 of the present invention.
Figure 7:
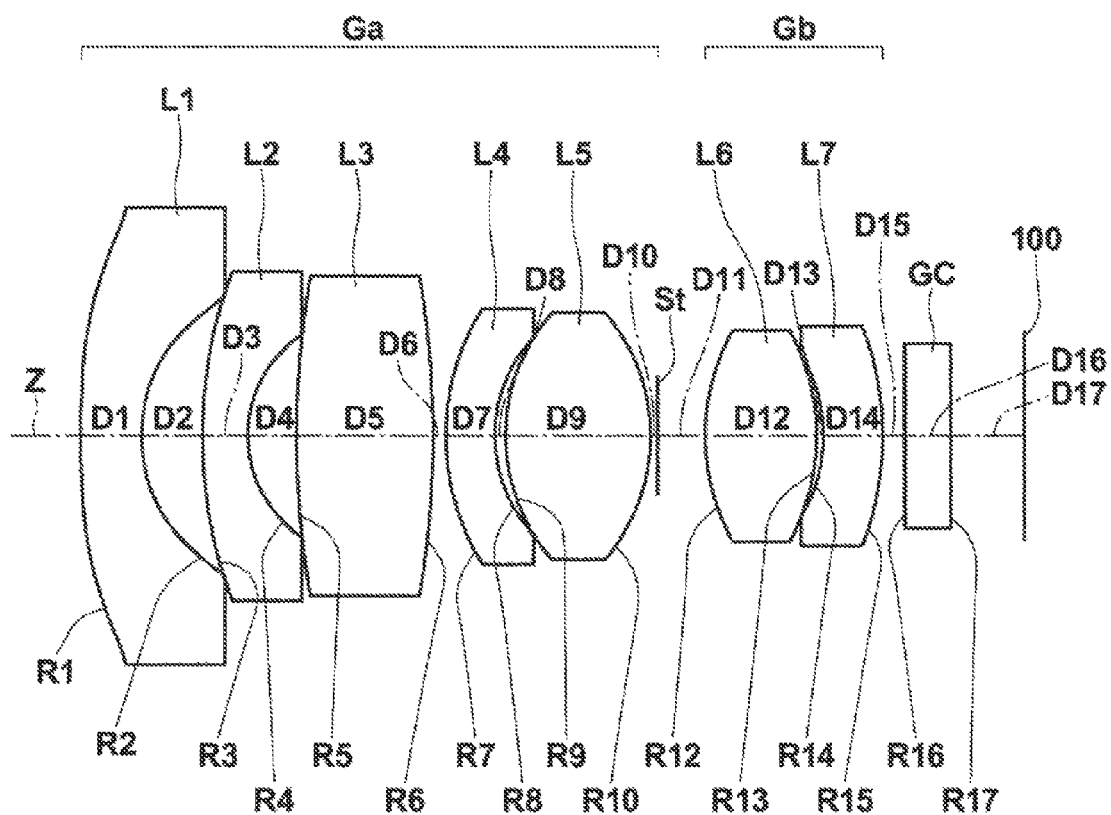
FIG. 7 is a cross section illustrating the lens structure of an imaging lens in Example 7 of the present invention.

Hereinafter, embodiments of the present invention will be described in detail with reference to drawings. FIG. 1 is a cross section illustrating an example of the structure of an imaging lens according to an embodiment of the present invention. FIG. 1 corresponds to an imaging lens in Example 1, which will be described later. FIG. 2 through FIG. 7 are cross sections illustrating other examples of the structure of an imaging lens according to an embodiment of the present invention. FIG. 2 through FIG. 7 correspond to the imaging lenses in Examples 2 through 7, respectively, which will be described later. The basic structure of the examples illustrated in FIG. 1 through FIG. 7 is almost similar to each other, and the illustration method is also similar. Therefore, the imaging lens according to embodiments of the present invention will be described mainly with reference to FIG. 1.

In FIG. 1, the left side is an object side, and the right side is an image side, and the arrangement of an optical system in an infinity focus state is illustrated. This is similar also in FIG. 2 through FIG. 7, which will be described later. In FIG. 1 through FIG. 7, sign Ri represents a curvature radius of an i-th surface when a most-object-side surface of composition elements is the first surface and the number of i sequentially increases toward the image side (image formation side). Sign Di represents a surface distance on optical axis Z between the i-th surface and the (i+1)th surface.

An imaging lens according to an embodiment of the present invention consists essentially of two lens groups of front group Ga having positive refractive power as a whole and rear group Gb having positive refractive power as a whole in this order from the object side, as lens groups. Further, aperture stop St is arranged between front group Ga and rear group Gb.

Front group Ga consists essentially of first lens L1 having a negative meniscus shape with its convex surface facing an object side, second lens L2 having negative refractive power, third lens L3 having positive refractive power, fourth lens L4 having a negative meniscus shape with its concave surface facing an image side and fifth lens L5 having positive refractive power in this order from the object side. Here, second lens L2 is an aspheric lens the object-side surface and the image-side surface of which are aspherical. In Example 2, which will be described later, front group Ga is structured in a similar manner to Example 1. However, Examples 3 through 7 differ from Example 1 in that first lens L1 instead of second lens L2 is an aspheric lens the object-side surface and the image-side surface of which are aspherical.

Rear group Gb consists essentially of sixth lens L6 having positive refractive power and seventh lens L7 having a negative meniscus shape with its concave surface facing the object side. In Examples 2 through 7, which will be described later, rear group Gb is structured in a similar manner to Example 1.

Aperture stop St illustrated in FIG. 1 does not necessarily represent the size nor the shape of the aperture stop, but the position of the aperture stop on optical axis. Further, FIG. 1 illustrates an image formation surface 100. An imaging device, such as a CCD (Charge Coupled Device) and a CMOS (Complementary Metal Oxide Semiconductor), is arranged at the image formation surface. Further, optical member GC, such as a cover glass and various filters, may be arranged between seventh lens L7, which is the last lens, and the image formation surface 100 based on the configuration of the imaging apparatus on which the lens is mounted. The various filters are an infrared-ray-cut filter, a low-pass filter and the like. FIG. 1 illustrates also optical member GC. FIG. 1 illustrates an example in which optical member GC is arranged between the lens system and the imaging device. Instead of arranging various filters, such as a low-pass filter and a filter that cuts a specific wavelength band, and the like between the lens system and the imaging device, these various filters and the like may be arranged between lenses. Alternatively, a coating having an action similar to that of various filters may be applied to a lens surface of one of the lenses.

When first lens L1 and second lens L2 have negative refractive power, it is possible to reduce an angle of incidence of rays in a peripheral part of the angle of view entering third lens L3 and lenses after third lens L3, and that is advantageous to widening an angle. When first lens L1 is a meniscus lens with its convex surface facing the object side, it is possible to suppress generation of astigmatism, a lateral chromatic aberration and excessive distortion.

When third lens L3 has positive refractive power, it is possible to cancel out various aberrations generated in first lens L1 and second lens L2, and especially a lateral chromatic aberrations, and that is advantageous to widening an angle.

When fourth lens L4 has negative refractive power, it is possible to correct a longitudinal chromatic aberration and a spherical aberration. Especially, when fourth lens L4 is a meniscus lens with its convex surface facing the object side, it is possible to suppress generation of astigmatism.

Fifth lens L5 together with sixth lens L6 carries main positive refractive power of the entire system. When fifth lens L5 and sixth lens L6 face each other with aperture stop St therebetween, it is possible to prevent generation of a coma aberration and a lateral chromatic aberration.

When seventh lens L7 has negative refractive power, it is possible to correct a longitudinal chromatic aberration, a lateral chromatic aberration and a spherical aberration. When seventh lens L7 has a meniscus shape with its concave surface facing the object side, it is possible to suppress generation of astigmatism. Further, since the shape of seventh lens L7 and the shape of fourth lens L4 are symmetrical with aperture stop St therebetween, it is possible to suppress generation of a coma aberration.

The imaging lens according to the embodiments of the present invention has the aforementioned structure, and satisfies the following conditional formula (1):

$$0.6 < |f12|/f < 1.5 \quad (1),\text{ where}$$

f12: a combined focal length of first lens L1 and second lens L2, and f: a focal length of an entire system.

If the value is lower than the lower limit of conditional formula (1), positive refractive power of third lens L3 and thereafter becomes strong, and curvature of field increases. If the value exceeds the upper limit of conditional formula (1), negative refractive power of first lens L1 and second lens L2 becomes weak, and that is disadvantageous to widening an angle. Further, a spherical aberration is insufficiently corrected, and that is not appropriate for a larger diameter.

To further enhance the aforementioned action and effect, it is desirable that the following conditional formula (1-1) is satisfied. It is more desirable that the following conditional formula (1-2) is satisfied:

$$0.7 < |f12|/f < 1.3 \quad (1\text{-}1);\text{ and}$$

$$0.8 < |f12|/f < 1.2$$

In the imaging lens according to an embodiment of the present invention, first lens L1 having a negative meniscus shape with its convex surface facing the object side, second lens L2 having negative refractive power, and third lens L3 having positive refractive power are arranged. Therefore, it is possible to widen an angle of view, and to excellently correct a lateral chromatic aberration.

Further, fourth lens L4 having a negative meniscus shape with its concave surface facing the image side, fifth lens L5 having positive refractive power, sixth lens L6 having positive refractive power and seventh lens L7 having a negative meniscus shape with its concave surface facing the object side are arranged. Therefore, it is possible to excellently correct a spherical aberration and a longitudinal chromatic aberration.

Therefore, according to the embodiment of the present invention, it is possible to reduce the total length, and to structure the imaging lens in small size. Further, it is possible to structure the imaging lens, as a fast lens having a wide angle of view and excellent optical performance.

Next, desirable structure of the imaging lens according to the embodiment of the present invention will be described.

It is desirable that second lens L2 has a negative meniscus shape with its convex surface facing the object side. Accordingly, it is possible to suppress generation of astigmatism, a lateral chromatic aberration and excessive distortion in a similar manner to first lens L1.

It is desirable that third lens L3 is a biconvex lens. Accordingly, it is possible to suppress generation of a spherical aberration and a coma aberration.

It is desirable that the following conditional formula (2) is satisfied:

$$1.3 < fa/f < 1.9 \qquad (2),\text{ where}$$

fa: a focal length of front group Ga, and
f: a focal length of an entire system.

If the value is lower than the lower limit of conditional formula (2), the positive refractive power of front group Ga becomes too strong, and a spherical aberration is insufficiently corrected. If the value exceeds the upper limit of conditional formula (2), the positive refractive power of rear group Gb becomes too strong, and a lateral chromatic aberration increases. That is disadvantageous also to reduction of the total length.

To further enhance the aforementioned action and effect, it is desirable that the following conditional formula (2-1) is satisfied:

$$1.4 < fa/f < 1.8 \qquad (2\text{-}1).$$

It is desirable that the following conditional formula (3) is satisfied:

$$0.5 < fa/f5 < 1.4 \qquad (3),\text{ where}$$

fa: a focal length of front group Ga, and
f5: a focal length of fifth lens L5.

If the value is lower than the lower limit of conditional formula (3), the positive refractive power of fifth lens L5 becomes weak, and a spherical aberration is excessively corrected. If the value exceeds the upper limit of conditional formula (3), the positive refractive power of fifth lens L5 becomes strong, and a spherical aberration is insufficiently corrected.

To further enhance the aforementioned action and effect, it is desirable that the following conditional formula (3-1) is satisfied. It is more desirable that the following conditional formula (3-2) is satisfied:

$$0.7 < fa/f5 < 1.3 \qquad (3\text{-}1);\text{ and}$$

$$0.8 < fa/f5 < 1.2 \qquad (3\text{-}2).$$

It is desirable that the following conditional formula (4) is satisfied:

$$vd3 < 26.0 \qquad (4),\text{ where}$$

vd3: an Abbe number of third lens L3 for d-line.

If the value exceeds the upper limit of conditional formula (4), a lateral chromatic aberration increases.

To further enhance the aforementioned action and effect, it is desirable that the following conditional formula (4-1) is satisfied:

$$vd3 < 23.0 \qquad (4\text{-}1).$$

It is desirable that the following conditional formula (5) is satisfied:

$$3.5 < L/Rr1 < 9.0 \qquad (5),\text{ where}$$

L: a length from a vertex of an object-side surface of first lens L1 to a paraxial image formation position determined by first lens L1 through seventh lens L7, and
Rr1: a paraxial curvature radius of an image-side of first lens L1.

If the value is lower than the lower limit of conditional formula (5), negative refractive power becomes weak, and curvature of field increases. If the value exceeds the upper limit of conditional formula (5), the total length becomes long, and it becomes difficult to reduce size.

To further enhance the aforementioned action and effect, it is desirable that the following conditional formula (5-1) is satisfied:

$$4.0 < L/Rr1 < 7.0 \qquad (5\text{-}1).$$

It is desirable that the following conditional formula (6) is satisfied:

$$3.5 < L/Rr2 < 10.0 \qquad (6),\text{ where}$$

L: a length from a vertex of an object-side surface of first lens L1 to a paraxial image formation position determined by first lens L1 through seventh lens L7, and
Rr2: a paraxial curvature radius of an image-side of second lens L2.

If the value is lower than the lower limit of conditional formula (6), negative refractive power becomes weak, and curvature of field increases. If the value exceeds the upper limit of conditional formula (6), the total length becomes long, and it becomes difficult to reduce size.

To further enhance the aforementioned action and effect, it is desirable that the following conditional formula (6-1) is satisfied:

$$4.5 < L/Rr2 < 9.0 \qquad (6\text{-}1).$$

It is desirable that the following conditional formula (7) is satisfied:

$$0.4 < f5/f6 < 1 \qquad (7),\text{ where}$$

f5: a focal length of fifth lens L5, and
f6: a focal length of sixth lens L6.

If the value is lower than the lower limit of conditional formula (7), the positive refractive power of sixth lens L6 becomes weak, and a spherical aberration is excessively corrected. If the value exceeds the upper limit of conditional formula (7), the positive refractive power of sixth lens L6 increases, and a spherical aberration is insufficiently corrected, and astigmatism increases.

To further enhance the aforementioned action and effect, it is desirable that the following conditional formula (7-1) is satisfied:

$$0.55 < f5/f6 < 0.85 \qquad (7\text{-}1).$$

Example of Application to Imaging Apparatus

Figure 22:
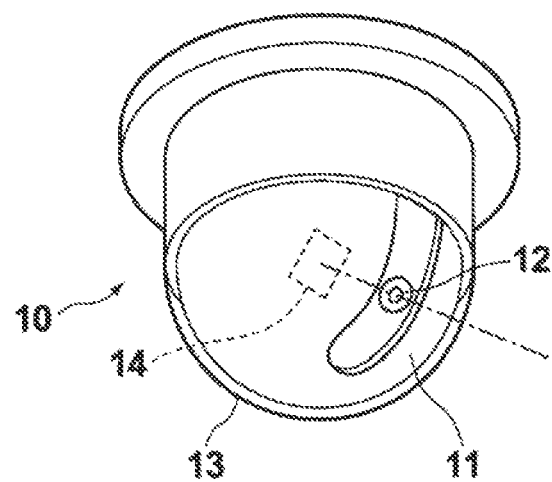
FIG. 22 is a schematic diagram illustrating the configuration of an imaging apparatus according to an embodiment of the present invention.

Next, an imaging apparatus according to the present invention will be described. FIG. 22 is a schematic diagram illustrating the configuration of a surveillance camera, as an imaging apparatus according to an embodiment of the present invention. A surveillance camera 10 illustrated in FIG. 22 is a camera connected to a network, and which is used to perform remote surveillance. An imaging lens 12 according to an embodiment of the present invention is provided in a dome-shaped camera body 11 covered by a transparent cover 13. The imaging lens 12 is provided in such a manner that an imaging direction is changeable so that imaging in an arbitrary direction is possible. Further, an imaging device 14 is provided in the camera body 11. The imaging device 14 images an optical image formed by the imaging lens 12, and converts the image into electrical signals. For example, the imaging device 14 is composed of a CCD, a CMOS or the like. The imaging device 14 is arranged in such a manner that optical axis Z of the imaging lens 12 intersects at the center of the imaging device 14. The imaging lens 12 and the imaging device 14 are integrated to make the imaging direction changeable.

As described above, the imaging lens 12 according to the embodiment of the present invention has sufficiently small size. Therefore, it is possible to make the surveillance camera 10 compact. Further, the surveillance camera 10 to which the imaging lens 12 of the present invention has been applied can perform imaging with higher image qualities.

The imaging lens according to the embodiment of the present invention is applicable not only to the surveillance camera but also to various kinds of electronic cameras, such as a digital camera, a video camera and an in-vehicle camera.

EXAMPLES

Next, specific examples of the imaging lens according to embodiments of the present invention will be described.

Example 1

FIG. 1 is a diagram illustrating the arrangement of lens groups of the imaging lens in Example 1. The lens groups and each lens in the structure illustrated in FIG. 1 have been described in detail already. Therefore, explanation will be omitted unless especially necessary.

Table 1 through Table 3 show specific lens data corresponding to the structure of the imaging lens in Example 1, illustrated in FIG. 1. Table 1 shows basic lens data about the imaging lens in Example 1. Table 2 shows other data about the imaging lens in Example 1, and Table 3 shows its aspherical surface data. In Table 1, the column of Si shows the surface number of the i-th surface (i=1, 2, 3, ... ). The object-side surface of the most object-side composition element is the first surface, and surface numbers sequentially increase toward the image side. The column of Ri shows the curvature radius (mm) of the i-th surface, and the column of Di shows a distance on optical axis Z between the i-th surface and the (i+1)th surface. The column of ndj shows the refractive index of the j-th composition element (j=1, 2, 3, ... ) for d-line (wavelength is 587.6 nm). The most-object side composition element is the first composition element, and the number j sequentially increases toward the image side. The column of vdj shows the Abbe number of the j-th composition element for d-line. Here, the basic lens data include aperture stop St. In the column of the curvature radius, the sign of ∞ is written for a surface corresponding to aperture stop St. Numerical values in Table 1 are rounded at predetermined digits. Further, the sign of a curvature radius is positive when a surface shape is convex toward the object side, and negative when a surface shape is convex toward the image side.

In the lens data of Table 1, the sign of * is attached to surface numbers of aspherical surfaces. As the curvature radius of an aspherical surface, a numerical value of a paraxial curvature radius is shown. In Example 1, the object-side surface and the image-side surface of second lens L2 are aspherical surfaces.

Table 2 shows values of paraxial focal length f (mm), back focus Bf, F-number (FNo.) and angle of view (2ω).

Table 3 shows aspherical surface data of the imaging lens in Example 1. Table 3 shows the surface numbers of aspherical surfaces and aspherical surface coefficients about the respective aspherical surfaces. Here, "E-n" (n: integer) in the numerical value of the aspherical surface coefficient means "×10$^{-n}$". The aspherical surface coefficients are values of coefficients KA, Am (m=3, 4, 5, ... 20) in the following aspherical surface equation:

$$Zd = C \cdot h^2 / \{1 + (1 - KA \cdot C^2 \cdot h^2)^{1/2}\} + \Sigma Am \cdot h^m,\text{ where}$$

Zd: the depth of an aspherical surface (the length of a perpendicular from a point on the aspherical surface at height h to a plane that contacts with the vertex of the aspherical surface and is perpendicular to the optical axis), h: height (a length from the optical axis to the lens surface), C: a reciprocal of a paraxial curvature radius, and KA, Am: aspherical surface coefficients (m=3, 4, 5, ... 20).

The description methods of Tables 1 through 3, as described so far, are similar also in Tables 4 through 21, which will be described later.

In all of the following tables, mm is used as the unit of length, and degree (°) is used as the unit of angle. However, since an optical system is usable by proportionally enlarging or reducing the optical system, other appropriate units may be used.

Examples 2 through 7

FIGS. 2 through 7 are diagrams illustrating the structure of the imaging lenses in Example 2 through Example 7 of the present invention. The imaging lens in Example 2 is structured almost in a similar manner to the imaging lens in Example 1. Examples 3 through 7 are structured also almost in a similar manner to the imaging lens in Example 1. However, Examples 3 through 7 differ from Example 1 in that the object-side surface and the image-side surface of first lens L1 are aspherical instead of second lens L2.

In a similar manner to Example 1, Tables 4 through 6 show specific lens data of the imaging lens in Example 2. Further, Table 7 through 9 show specific lens data of the imaging lens in Example 3, and Tables 10 through 12 show specific lens data of the imaging lens in Example 4. Tables 13 through 15 show specific lens data of the imaging lens in Example 5, and Tables 16 through 18 show specific lens data of the imaging lens in Example 6. Tables 19 through 21 show specific lens data of the imaging lens in Example 7.

TABLE 1

EXAMPLE 1·LENS DATA

| Si | Ri | Di | ndj | v dj |
|---|---|---|---|---|
| 1 | 11.1794 | 0.75 | 1.77250 | 49.60 |
| 2 | 3.7645 | 1.10 | | |
| *3 | 42.9119 | 1.00 | 1.74330 | 49.33 |
| *4 | 2.9207 | 1.35 | | |
| 5 | 12.2269 | 2.91 | 1.95906 | 17.47 |
| 6 | −12.2269 | 0.45 | | |
| 7 | 18.9230 | 0.75 | 1.92286 | 20.88 |
| 8 | 3.5033 | 0.10 | | |
| 9 | 4.1120 | 2.87 | 1.74320 | 49.34 |
| 10 | −4.1120 | 0.10 | | |
| 11(STOP) | ∞ | 0.92 | | |
| 12 | 9.2163 | 2.38 | 1.61800 | 63.33 |
| 13 | −4.0051 | 0.10 | | |
| 14 | −3.3924 | 1.19 | 1.92286 | 20.88 |
| 15 | −6.3206 | 1.93 | | |
| 16 | ∞ | 1.00 | 1.51633 | 64.14 |
| 17 | ∞ | 0.33 | | |

TABLE 2

EXAMPLE 1·OTHER DATA

| f | 2.15 |
|---|---|
| Bf | 2.92 |
| FNo. | 2.10 |
| 2ω[°] | 109.6 |

TABLE 3

EXAMPLE 1·ASPHERICAL SURFACE COEFFICIENT

| SURFACE NUMBER | 3 | 4 |
|---|---|---|
| KA | 1.000000E+00 | 1.000000E+00 |
| A3 | 4.208130E−02 | 3.099364E−02 |
| A4 | −1.063670E−01 | 1.246234E−03 |
| A5 | 1.944983E−01 | −1.251940E−01 |
| A6 | −1.636670E−01 | 3.580644E−01 |
| A7 | 5.985773E−02 | −3.427789E−01 |
| A8 | 7.122920E−04 | 6.811170E−02 |
| A9 | −5.580303E−03 | 6.961185E−02 |
| A10 | −2.619656E−04 | −9.488326E−03 |
| A11 | 7.238410E−04 | −2.371498E−02 |
| A12 | −5.553937E−05 | 5.266366E−03 |
| A13 | −6.643554E−06 | −9.713105E−04 |
| A14 | −1.094144E−05 | 2.150511E−03 |
| A15 | 1.049122E−07 | 5.850954E−04 |
| A16 | 1.106608E−06 | −7.599919E−04 |
| A17 | 7.425760E−08 | −1.337233E−04 |
| A18 | −9.431533E−08 | 1.447544E−04 |
| A19 | 9.951901E−09 | −7.712842E−06 |
| A20 | 8.259134E−11 | −4.120546E−06 |

TABLE 4

EXAMPLE 2·LENS DATA

| Si | Ri | Di | ndj | ν dj |
|---|---|---|---|---|
| 1 | 10.6153 | 1.00 | 1.79999 | 48.00 |
| 2 | 3.3460 | 1.49 | | |
| *3 | −214748.3648 | 1.28 | 1.79979 | 48.02 |
| *4 | 3.0602 | 1.48 | | |
| 5 | 16.9089 | 2.11 | 1.95000 | 18.74 |
| 6 | −16.9089 | 0.10 | | |
| 7 | 4.3159 | 0.80 | 1.94999 | 17.64 |
| 8 | 2.8027 | 0.21 | | |
| 9 | 3.4472 | 2.26 | 1.51796 | 67.20 |
| 10 | −3.4472 | 0.10 | | |
| 11(STOP) | ∞ | 1.50 | | |
| 12 | 5.5796 | 2.15 | 1.55190 | 72.02 |
| 13 | −5.5796 | 0.38 | | |
| 14 | −2.8027 | 0.80 | 1.94999 | 17.64 |
| 15 | −4.3159 | 0.50 | | |
| 16 | ∞ | 1.00 | 1.51633 | 64.14 |
| 17 | ∞ | 1.41 | | |

TABLE 5

EXAMPLE 2·OTHER DATA

| f | 2.14 |
|---|---|
| Bf | 2.57 |
| FNo. | 2.30 |
| 2ω[°] | 108.2 |

TABLE 6

EXAMPLE 2·ASPHERICAL SURFACE COEFFICIENT

| SURFACE NUMBER | 3 | 4 |
|---|---|---|
| KA | 1.000000E+00 | 1.000000E+00 |
| A3 | 2.835869E−02 | 3.186820E−02 |
| A4 | −7.974517E−02 | −1.377819E−01 |
| A5 | 1.830611E−01 | 6.484797E−01 |
| A6 | −1.951829E−01 | −1.865274E+00 |
| A7 | 9.658056E−02 | 3.507128E+00 |
| A8 | −6.151822E−03 | −4.000801E+00 |
| A9 | −1.438543E−02 | 2.343891E+00 |

TABLE 6-continued

EXAMPLE 2·ASPHERICAL SURFACE COEFFICIENT

| SURFACE NUMBER | 3 | 4 |
|---|---|---|
| A10 | 5.526600E−03 | −2.406158E−01 |
| A11 | −6.729285E−04 | −3.037823E−01 |
| A12 | −3.712928E−05 | −1.070423E−01 |
| A13 | 1.083675E−04 | 1.897931E−01 |
| A14 | −3.057006E−05 | −3.874901E−02 |
| A15 | −1.751666E−06 | 3.313051E−02 |
| A16 | −4.172923E−06 | −6.370088E−02 |
| A17 | −6.594628E−07 | 3.575589E−02 |
| A18 | 2.880725E−06 | −6.496675E−03 |
| A19 | −1.050290E−06 | −4.493069E−04 |
| A20 | 1.138759E−07 | 1.948368E−04 |

TABLE 7

EXAMPLE 3·LENS DATA

| Si | Ri | Di | ndj | ν dj |
|---|---|---|---|---|
| *1 | 29.1761 | 1.00 | 1.74330 | 49.33 |
| *2 | 3.7274 | 1.55 | | |
| 3 | 16.6239 | 0.70 | 1.71299 | 53.87 |
| 4 | 2.6491 | 2.15 | | |
| 5 | 14.4860 | 1.65 | 1.92286 | 18.90 |
| 6 | −14.4860 | 0.10 | | |
| 7 | 4.2133 | 0.83 | 1.95906 | 17.47 |
| 8 | 2.4881 | 0.23 | | |
| 9 | 3.1921 | 3.24 | 1.48749 | 70.23 |
| 10 | −3.1921 | 0.10 | | |
| 11(STOP) | ∞ | 1.50 | | |
| 12 | 4.8218 | 2.14 | 1.48749 | 70.23 |
| 13 | −4.8218 | 0.14 | | |
| 14 | −3.2829 | 1.06 | 1.95906 | 17.47 |
| 15 | −6.1898 | 0.50 | | |
| 16 | ∞ | 1.00 | 1.51633 | 64.14 |
| 17 | ∞ | 1.42 | | |

TABLE 8

EXAMPLE 3·OTHER DATA

| f | 2.10 |
|---|---|
| Bf | 2.58 |
| FNo. | 2.30 |
| 2ω[°] | 107.6 |

TABLE 9

EXAMPLE 3·ASPHERICAL SURFACE COEFFICIENT

| SURFACE NUMBER | 1 | 2 |
|---|---|---|
| KA | 1.000000E+00 | 1.000000E+00 |
| A3 | 1.102807E−02 | 1.483761E−02 |
| A4 | −5.731745E−05 | −1.804611E−03 |
| A5 | −1.842863E−04 | 1.057368E−03 |
| A6 | 8.880942E−06 | 8.661125E−06 |
| A7 | 1.865068E−06 | −4.482724E−05 |
| A8 | −6.438469E−07 | 1.939628E−05 |
| A9 | 5.024157E−08 | −3.994451E−06 |
| A10 | 1.119831E−08 | −1.078121E−06 |
| A11 | 0.000000E+00 | 0.000000E+00 |
| A12 | 0.000000E+00 | 0.000000E+00 |
| A13 | 0.000000E+00 | 0.000000E+00 |
| A14 | 0.000000E+00 | 0.000000E+00 |
| A15 | 0.000000E+00 | 0.000000E+00 |
| A16 | 0.000000E+00 | 0.000000E+00 |
| A17 | 0.000000E+00 | 0.000000E+00 |

TABLE 9-continued

EXAMPLE 3·ASPHERICAL SURFACE COEFFICIENT

| SURFACE NUMBER | 1 | 2 |
|---|---|---|
| A18 | 0.000000E+00 | 0.000000E+00 |
| A19 | 0.000000E+00 | 0.000000E+00 |
| A20 | 0.000000E+00 | 0.000000E+00 |

TABLE 10

EXAMPLE 4·LENS DATA

| Si | Ri | Di | ndj | ν dj |
|---|---|---|---|---|
| *1 | 15.4144 | 1.00 | 1.74330 | 49.33 |
| *2 | 3.1692 | 1.42 | | |
| 3 | 15.0866 | 0.80 | 1.77250 | 49.60 |
| 4 | 2.7907 | 1.98 | | |
| 5 | 12.3356 | 1.72 | 1.95906 | 17.47 |
| 6 | −12.3356 | 0.10 | | |
| 7 | 4.5066 | 0.80 | 1.95906 | 17.47 |
| 8 | 2.3410 | 0.24 | | |
| 9 | 2.9972 | 3.34 | 1.48749 | 70.23 |
| 10 | −2.9972 | 0.10 | | |
| 11(STOP) | ∞ | 1.50 | | |
| 12 | 5.0625 | 2.11 | 1.48749 | 70.23 |
| 13 | −5.0625 | 0.18 | | |
| 14 | −3.1550 | 1.10 | 1.95906 | 17.47 |
| 15 | −5.6031 | 0.50 | | |
| 16 | ∞ | 1.00 | 1.51633 | 64.14 |
| 17 | ∞ | 1.43 | | |

TABLE 11

EXAMPLE 4·OTHER DATA

| f | 2.14 |
|---|---|
| Bf | 2.59 |
| FNo. | 2.30 |
| 2ω[°] | 107.8 |

TABLE 12

EXAMPLE 4·ASPHERICAL SURFACE COEFFICIENT

| SURFACE NUMBER | 1 | 2 |
|---|---|---|
| KA | 1.000000E+00 | 1.000000E+00 |
| A3 | 0.000000E+00 | 0.000000E+00 |
| A4 | 1.313101E−03 | 7.399371E−04 |
| A5 | 0.000000E+00 | 0.000000E+00 |
| A6 | −2.117150E−05 | 7.609162E−06 |
| A7 | 0.000000E+00 | 0.000000E+00 |
| A8 | −1.352443E−06 | 3.678594E−05 |
| A9 | 0.000000E+00 | 0.000000E+00 |
| A10 | 5.112565E−08 | −8.002525E−06 |
| A11 | 0.000000E+00 | 0.000000E+00 |
| A12 | 0.000000E+00 | 0.000000E+00 |
| A13 | 0.000000E+00 | 0.000000E+00 |
| A14 | 0.000000E+00 | 0.000000E+00 |
| A15 | 0.000000E+00 | 0.000000E+00 |
| A16 | 0.000000E+00 | 0.000000E+00 |
| A17 | 0.000000E+00 | 0.000000E+00 |
| A18 | 0.000000E+00 | 0.000000E+00 |
| A19 | 0.000000E+00 | 0.000000E+00 |
| A20 | 0.000000E+00 | 0.000000E+00 |

TABLE 13

EXAMPLE 5·LENS DATA

| Si | Ri | Di | ndj | ν dj |
|---|---|---|---|---|
| *1 | 27.0243 | 1.07 | 1.74330 | 49.33 |
| *2 | 3.7160 | 1.34 | | |
| 3 | 9.0069 | 0.70 | 1.77250 | 49.60 |
| 4 | 2.4739 | 1.09 | | |
| 5 | 18.5848 | 2.41 | 1.92286 | 18.90 |
| 6 | −18.5848 | 0.86 | | |
| 7 | 6.3990 | 1.11 | 1.92286 | 18.90 |
| 8 | 3.2922 | 0.11 | | |
| 9 | 4.0000 | 2.69 | 1.67003 | 47.23 |
| 10 | −4.0000 | 0.14 | | |
| 11(STOP) | ∞ | 1.48 | | |
| 12 | 5.1132 | 2.33 | 1.49700 | 81.54 |
| 13 | −5.1132 | 0.14 | | |
| 14 | −3.7480 | 0.94 | 1.92286 | 18.90 |
| 15 | −7.0196 | 0.50 | | |
| 16 | ∞ | 1.00 | 1.51633 | 64.14 |
| 17 | ∞ | 1.42 | | |

TABLE 14

EXAMPLE 5·OTHER DATA

| f | 2.15 |
|---|---|
| Bf | 2.58 |
| FNo. | 2.30 |
| 2ω[°] | 107.8 |

TABLE 15

EXAMPLE 5·ASPHERICAL SURFACE COEFFICIENT

| SURFACE NUMBER | 1 | 2 |
|---|---|---|
| KA | 1.000000E+00 | 1.000000E+00 |
| A3 | 0.000000E+00 | 0.000000E+00 |
| A4 | 3.395734E−03 | 4.684930E−03 |
| A5 | 0.000000E+00 | 0.000000E+00 |
| A6 | −1.069373E−04 | 2.226284E−04 |
| A7 | 0.000000E+00 | 0.000000E+00 |
| A8 | 1.248318E−06 | 5.818162E−05 |
| A9 | 0.000000E+00 | 0.000000E+00 |
| A10 | 3.313107E−09 | −7.383476E−06 |
| A11 | 0.000000E+00 | 0.000000E+00 |
| A12 | 0.000000E+00 | 0.000000E+00 |
| A13 | 0.000000E+00 | 0.000000E+00 |
| A14 | 0.000000E+00 | 0.000000E+00 |
| A15 | 0.000000E+00 | 0.000000E+00 |
| A16 | 0.000000E+00 | 0.000000E+00 |
| A17 | 0.000000E+00 | 0.000000E+00 |
| A18 | 0.000000E+00 | 0.000000E+00 |
| A19 | 0.000000E+00 | 0.000000E+00 |
| A20 | 0.000000E+00 | 0.000000E+00 |

TABLE 16

EXAMPLE 6·LENS DATA

| Si | Ri | Di | ndj | ν dj |
|---|---|---|---|---|
| *1 | 144.1777 | 1.09 | 1.74330 | 49.33 |
| *2 | 3.9880 | 1.30 | | |
| 3 | 8.9022 | 0.70 | 1.77250 | 49.60 |
| 4 | 2.4883 | 1.08 | | |
| 5 | 17.0253 | 2.57 | 1.92286 | 20.88 |
| 6 | −17.0253 | 0.59 | | |
| 7 | 6.8470 | 1.14 | 1.92286 | 20.88 |
| 8 | 3.3467 | 0.11 | | |
| 9 | 4.0003 | 2.83 | 1.66739 | 51.47 |

TABLE 16-continued

EXAMPLE 6•LENS DATA

| Si | Ri | Di | ndj | νdj |
|---|---|---|---|---|
| 10 | −4.0003 | 0.10 | | |
| 11(STOP) | ∞ | 1.50 | | |
| 12 | 5.0756 | 2.41 | 1.49700 | 81.54 |
| 13 | −5.0756 | 0.17 | | |
| 14 | −3.6130 | 0.80 | 1.95906 | 17.47 |
| 15 | −6.3912 | 1.30 | | |
| 16 | ∞ | 1.00 | 1.51633 | 64.14 |
| 17 | ∞ | 0.62 | | |

TABLE 17

EXAMPLE 6•OTHER DATA

| f | 2.11 |
|---|---|
| Bf | 2.58 |
| FNo. | 2.30 |
| 2ω[°] | 108.8 |

TABLE 18

EXAMPLE 6•ASPHERICAL SURFACE COEFFICIENT

| SURFACE NUMBER | 1 | 2 |
|---|---|---|
| KA | 1.000000E+00 | 1.000000E+00 |
| A3 | 1.618167E−02 | 2.098076E−02 |
| A4 | −6.990582E−03 | −6.313129E−03 |
| A5 | 1.002364E−02 | 9.827392E−03 |
| A6 | −7.285379E−03 | −1.627143E−02 |
| A7 | 2.267006E−03 | 1.462165E−02 |
| A8 | −1.055025E−04 | 6.470903E−03 |
| A9 | −2.401201E−05 | −1.807910E−02 |
| A10 | −4.225094E−05 | 8.288594E−03 |
| A11 | 1.378468E−05 | −6.385620E−04 |
| A12 | 6.738161E−08 | 1.689505E−03 |
| A13 | −7.366189E−08 | −1.711072E−03 |
| A14 | −1.412619E−07 | 8.362840E−05 |
| A15 | 3.730547E−08 | 3.211565E−04 |
| A16 | −1.060881E−08 | −5.588769E−05 |
| A17 | 3.544318E−09 | −3.361337E−05 |
| A18 | −5.431180E−10 | 1.208680E−05 |
| A19 | 2.304405E−11 | −8.495063E−07 |
| A20 | 8.470596E−13 | −6.079110E−08 |

TABLE 19

EXAMPLE 7•LENS DATA

| Si | Ri | Di | ndj | νdj |
|---|---|---|---|---|
| *1 | 82.5325 | 1.32 | 1.74330 | 49.33 |
| *2 | 4.0192 | 1.34 | | |
| 3 | 10.1940 | 1.00 | 1.74320 | 49.34 |
| 4 | 2.6618 | 1.08 | | |
| 5 | 20.8193 | 2.99 | 1.92286 | 20.88 |
| 6 | −20.8193 | 0.28 | | |

TABLE 19-continued

EXAMPLE 7•LENS DATA

| Si | Ri | Di | ndj | νdj |
|---|---|---|---|---|
| 7 | 5.2331 | 1.08 | 1.75520 | 27.51 |
| 8 | 3.1768 | 0.24 | | |
| 9 | 4.1136 | 3.18 | 1.58913 | 61.14 |
| 10 | −4.1136 | 0.16 | | |
| 11(STOP) | ∞ | 1.05 | | |
| 12 | 4.7847 | 2.44 | 1.49700 | 81.54 |
| 13 | −4.7847 | 0.15 | | |
| 14 | −3.4471 | 1.31 | 1.95906 | 17.47 |
| 15 | −6.5834 | 0.49 | | |
| 16 | ∞ | 1.00 | 1.51633 | 64.14 |
| 17 | ∞ | 1.62 | | |

TABLE 20

EXAMPLE 7•OTHER DATA

| f | 2.20 |
|---|---|
| Bf | 2.77 |
| FNo. | 2.30 |
| 2ω[°] | 106.0 |

TABLE 21

EXAMPLE 7•ASPHERICAL SURFACE COEFFICIENT

| SURFACE NUMBER | 1 | 2 |
|---|---|---|
| KA | 1.000000E+00 | 1.000000E+00 |
| A3 | 1.547320E−02 | 1.353930E−02 |
| A4 | −1.881666E−02 | 1.613170E−02 |
| A5 | 1.340662E−02 | −7.068295E−02 |
| A6 | −8.804507E−04 | 8.497499E−02 |
| A7 | −1.963644E−03 | −3.533114E−02 |
| A8 | 2.325839E−04 | 3.501855E−03 |
| A9 | 2.377615E−04 | −3.339186E−03 |
| A10 | −3.281721E−05 | 1.732856E−03 |
| A11 | −1.913305E−05 | 1.386413E−03 |
| A12 | 2.636222E−06 | −4.565792E−04 |
| A13 | 1.064677E−06 | −3.682245E−04 |
| A14 | −1.538042E−07 | 9.553801E−05 |
| A15 | −2.980324E−08 | 4.003800E−05 |
| A16 | 2.409849E−09 | −1.772752E−06 |
| A17 | 1.327585E−09 | −6.335444E−06 |
| A18 | −2.048514E−10 | 3.361039E−07 |
| A19 | 6.940348E−12 | 4.519371E−07 |
| A20 | 9.328899E−14 | −6.787867E−08 |

Table 22 shows conditions defined by the aforementioned conditional formulas (1) through (7), specifically, values of letter parts of the formulas for each of Examples 1 through 7. Table 22 shows values for d-line. As Table 22 shows, all of the imaging lenses in Examples 1 through 7 satisfy all of conditional formulas (1) through (7). Further, all of the imaging lenses in Examples 1 through 7 satisfy all of conditional formulas defining more desirable ranges than the ranges defined by conditional formulas (1) through (7). Accordingly, effects as described above in detail are achievable.

TABLE 22

| FORMULA NUMBER | FORMULA | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| (1) | \|f12\|/f | 1.13371 | 0.94676 | 1.02105 | 0.99025 | 1.03186 | 1.01655 | 1.02956 |
| (2) | fa/f | 1.62724 | 1.73446 | 1.52596 | 1.48049 | 1.63699 | 1.67528 | 1.71415 |
| (3) | fa/f5 | 1.07596 | 0.99268 | 0.81513 | 0.84326 | 1.01899 | 1.01480 | 0.92537 |
| (4) | νd3 | 17.47 | 18.74 | 18.90 | 17.47 | 18.90 | 20.88 | 20.88 |

TABLE 22-continued

| FORMULA NUMBER | FORMULA | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|
| (5) | L/Rr1 | 5.02 | 5.45 | 5.09 | 5.99 | 5.11 | 4.76 | 5.07 |
| (6) | L/Rr2 | 6.47 | 5.96 | 7.16 | 6.80 | 7.67 | 7.62 | 7.66 |
| (7) | f5/f6 | 0.66994 | 0.69043 | 0.73634 | 0.67483 | 0.62002 | 0.62984 | 0.77494 |

Figure 8:
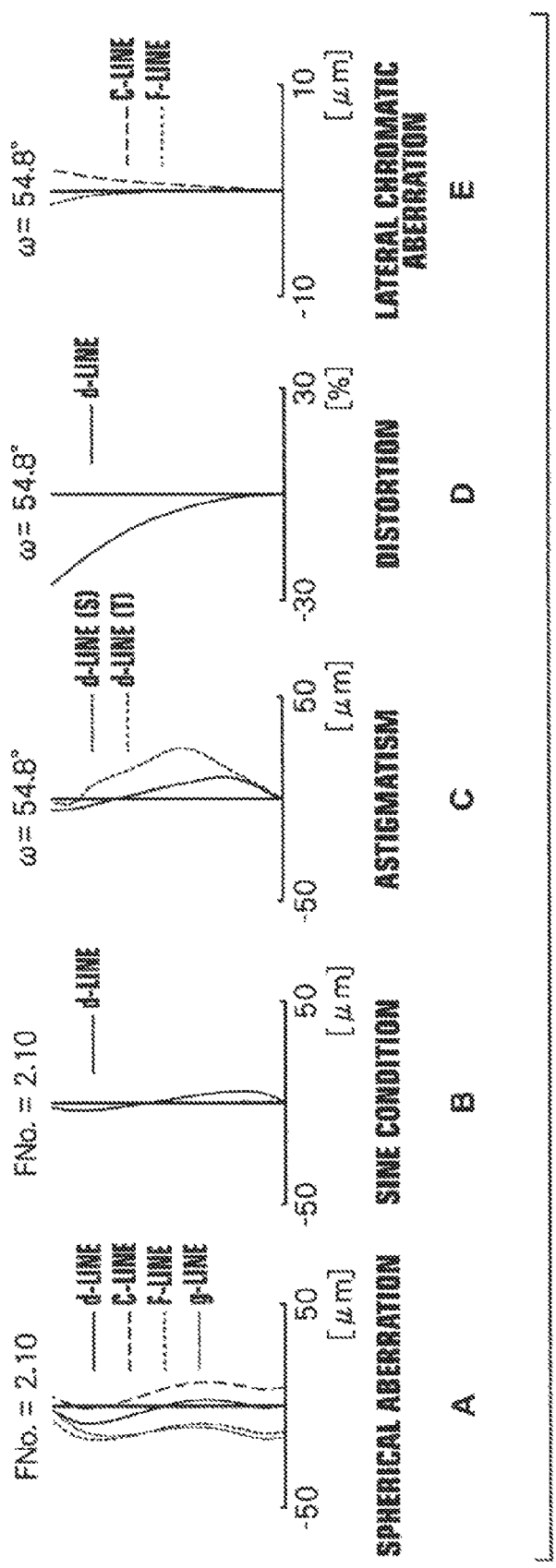
FIG. 8, Sections A through E are aberration diagrams of the imaging lens in Example 1 of the present invention.
Figure 9:
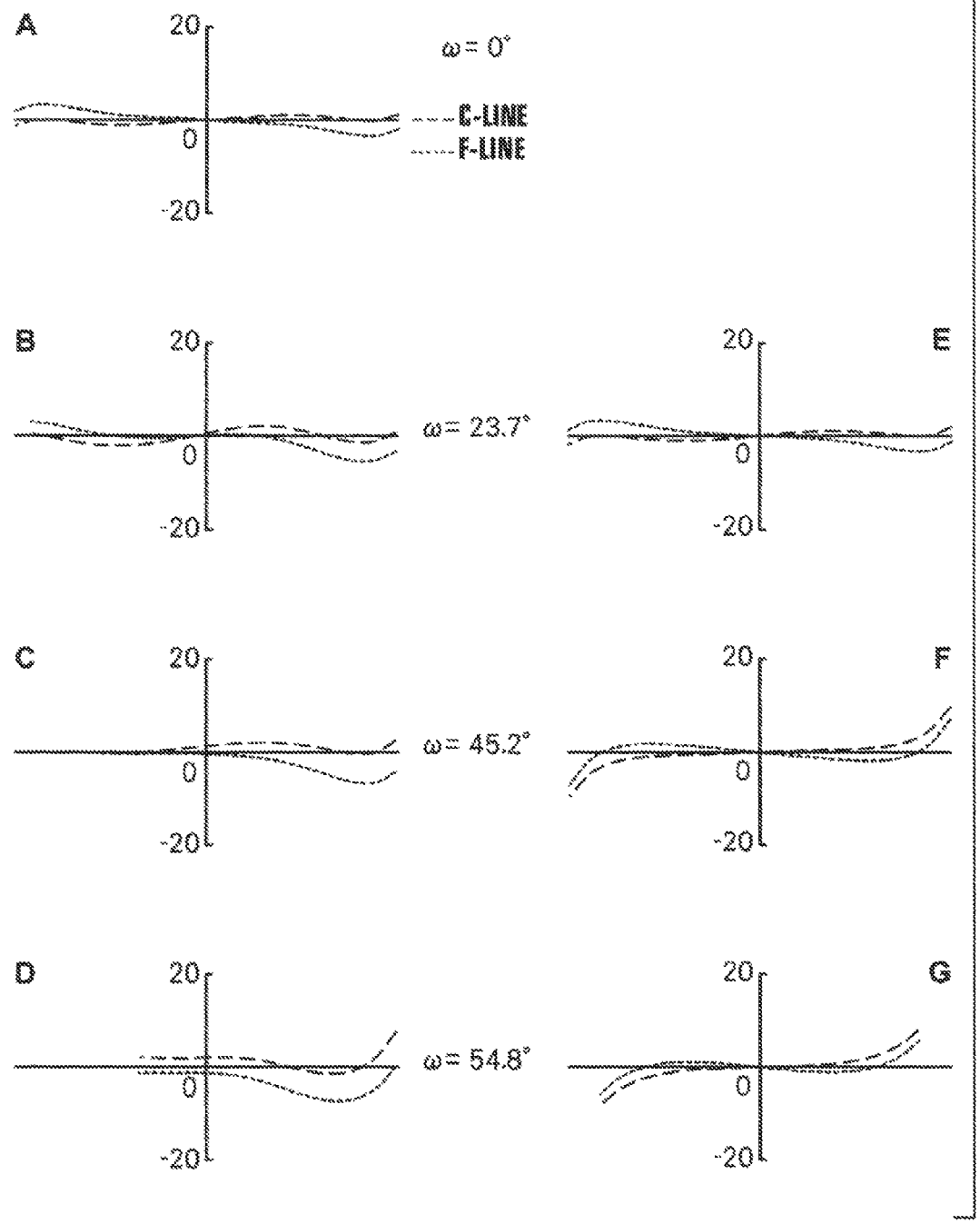
FIG. 9, Sections A through G are lateral aberration curves of the imaging lens in Example 1 of the present invention.

FIG. 8, Sections A through E illustrate aberration diagrams of the imaging lens in Example 1, and FIG. 9, Sections A through G illustrate lateral aberration curves of the imaging lens in Example 1 in an infinity focus state. FIG. 8, Sections A through E illustrate a spherical aberration, an aberration about offense against the sine condition, astigmatism, distortion, and a lateral chromatic aberration, respectively. FIG. 9, Sections A through D illustrate lateral aberrations in a tangential direction for each half angle of view. FIG. 9, Sections E through G illustrate lateral aberrations in a sagittal direction for each half angle of view. Each aberration is based on d-line (wavelength is 587.6 nm). However, the diagram of a spherical aberration illustrates aberrations also for the wavelength of 656.3 nm (C-line), the wavelength of 486.1 nm (F-line), and the wavelength of 435.8 nm (g-line). In the diagram of astigmatism, a solid line represents an aberration in the sagittal direction, and a broken line represents an aberration in the tangential direction. Here, mm is used as the unit of the scale of the vertical axis in the lateral aberration curves. However, the unit is not written in the diagrams. In the diagrams of the lateral chromatic aberration and the lateral aberration curves, aberrations for C-line and F-line are illustrated. FNo. represents an F-number, and ω represents a half angle of view. The method for representing the aberrations, as described above, is similar also in FIG. 9 through FIG. 21, which will be described later.

Figure 10:
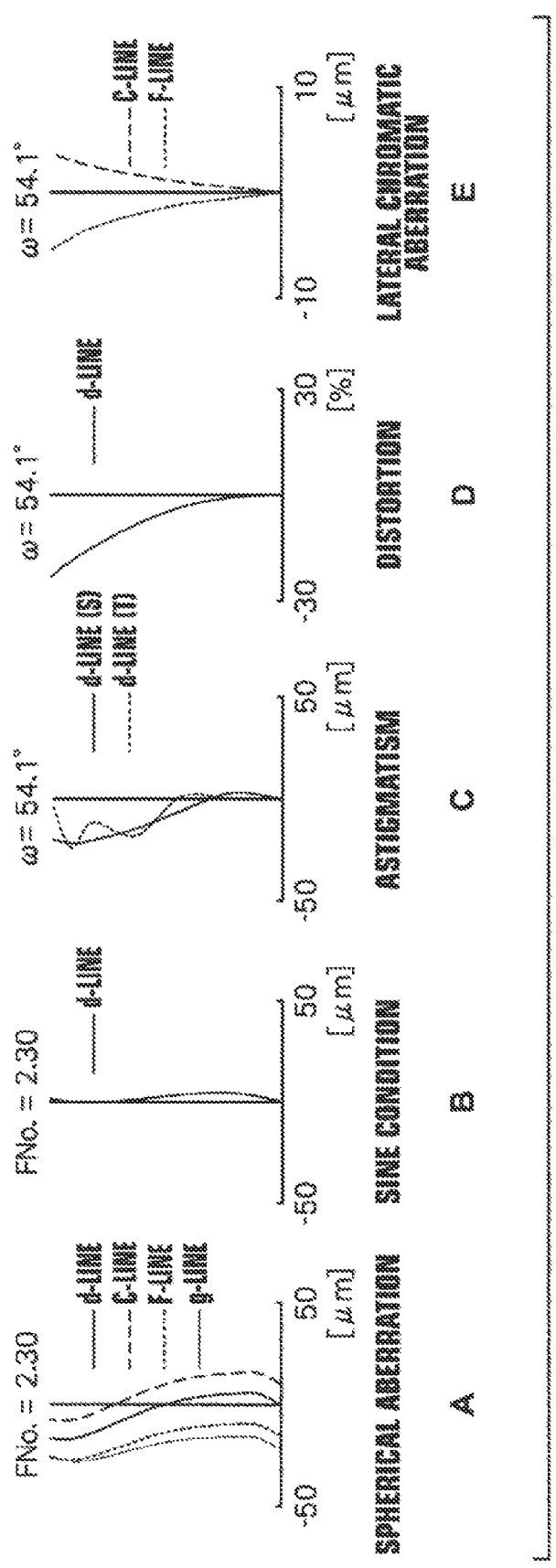
FIG. 10, Sections A through E are aberration diagrams of the imaging lens in Example 2 of the present invention.
Figure 11:
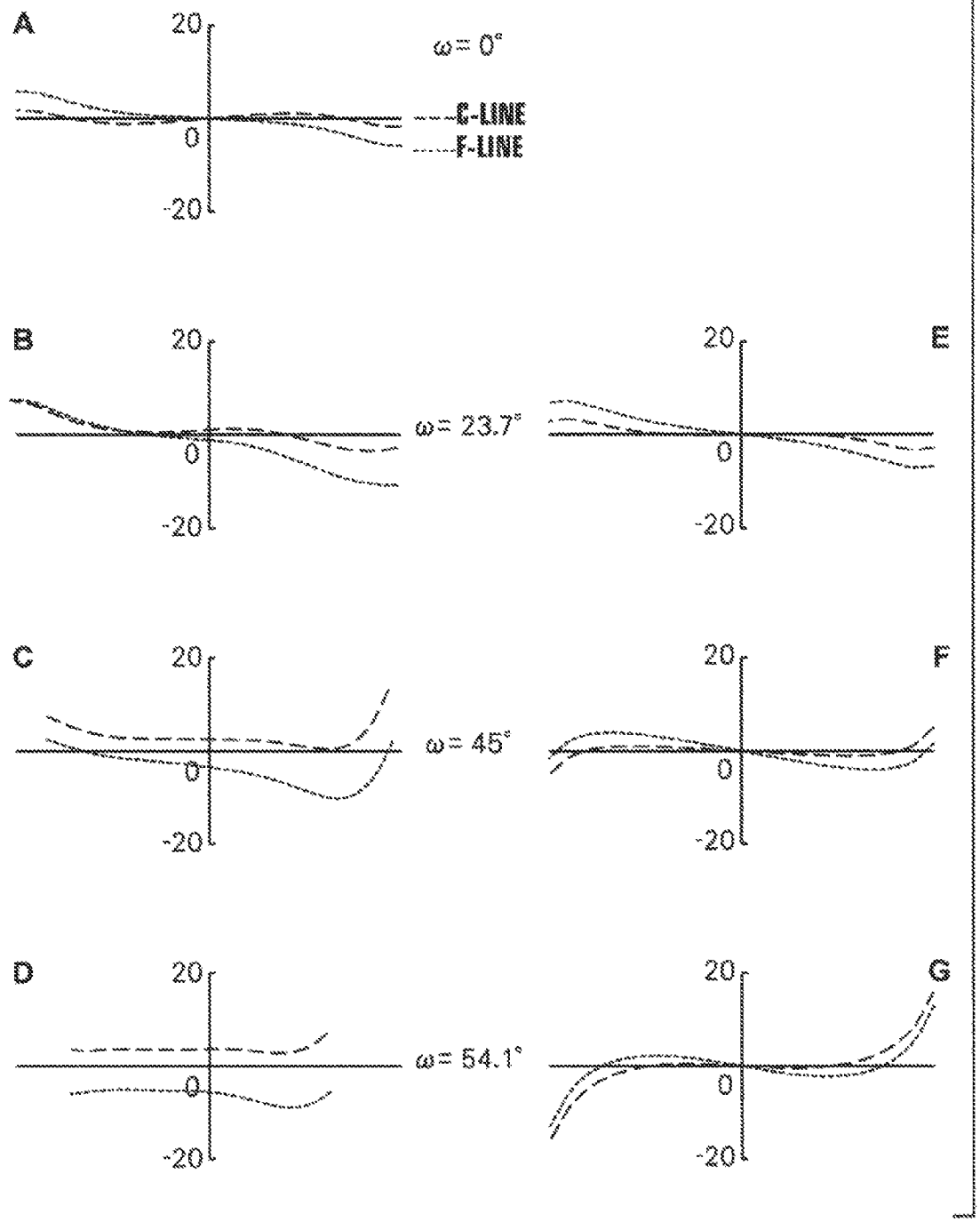
FIG. 11, Sections A through G are lateral aberration curves of the imaging lens in Example 2 of the present invention.
Figure 12:
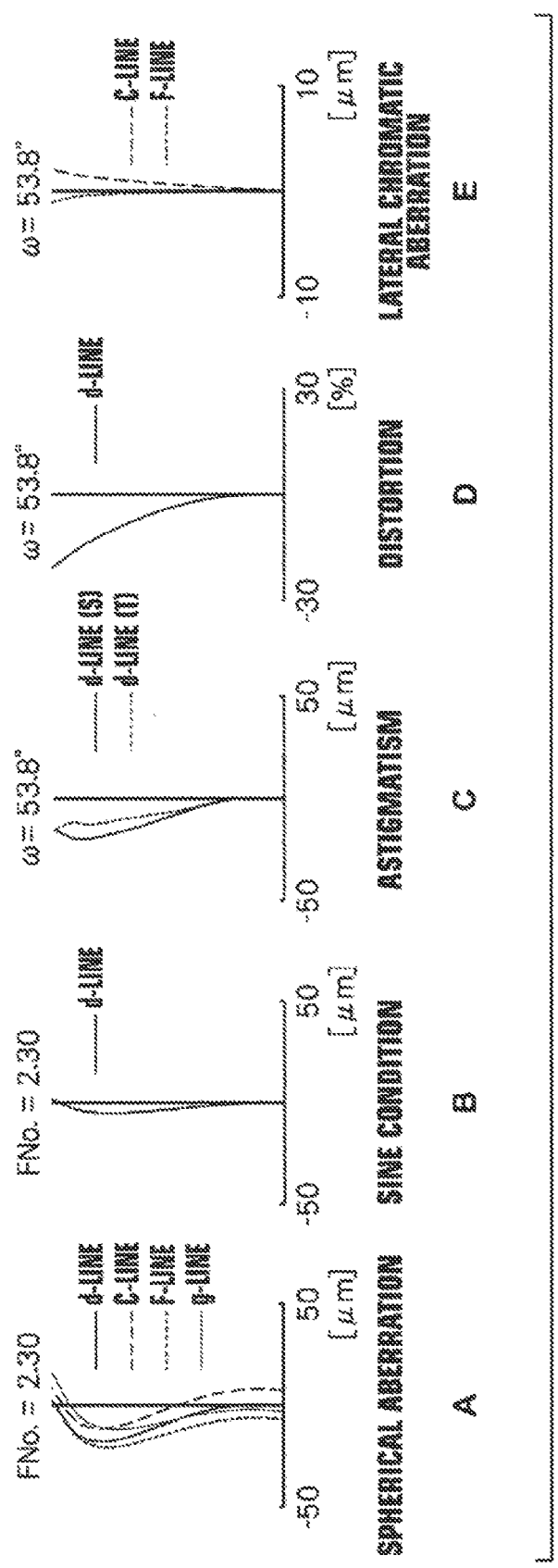
FIG. 12, Sections A through E are aberration diagrams of the imaging lens in Example 3 of the present invention.
Figure 13:
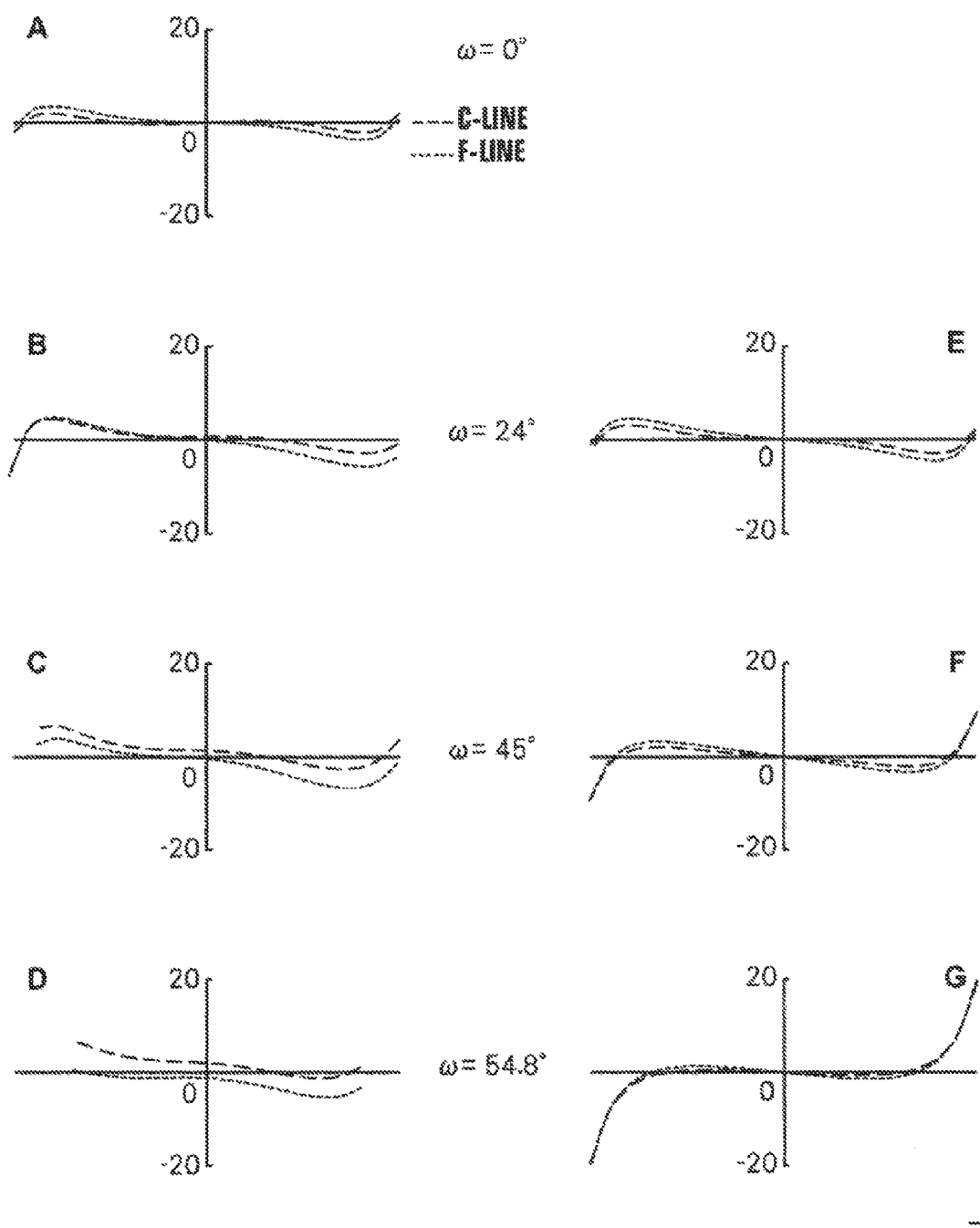
FIG. 13, Sections A through G are lateral aberration curves of the imaging lens in Example 3 of the present invention.
Figure 14:
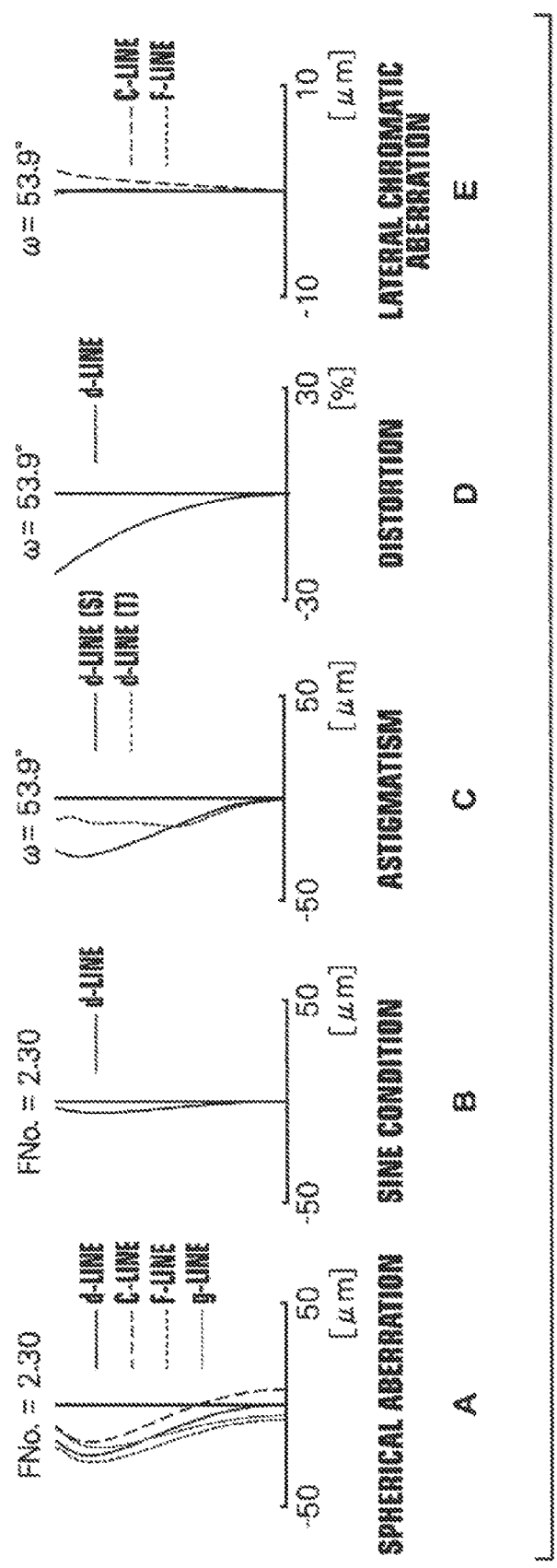
FIG. 14, Sections A through E are aberration diagrams of the imaging lens in Example 4 of the present invention.
Figure 15:
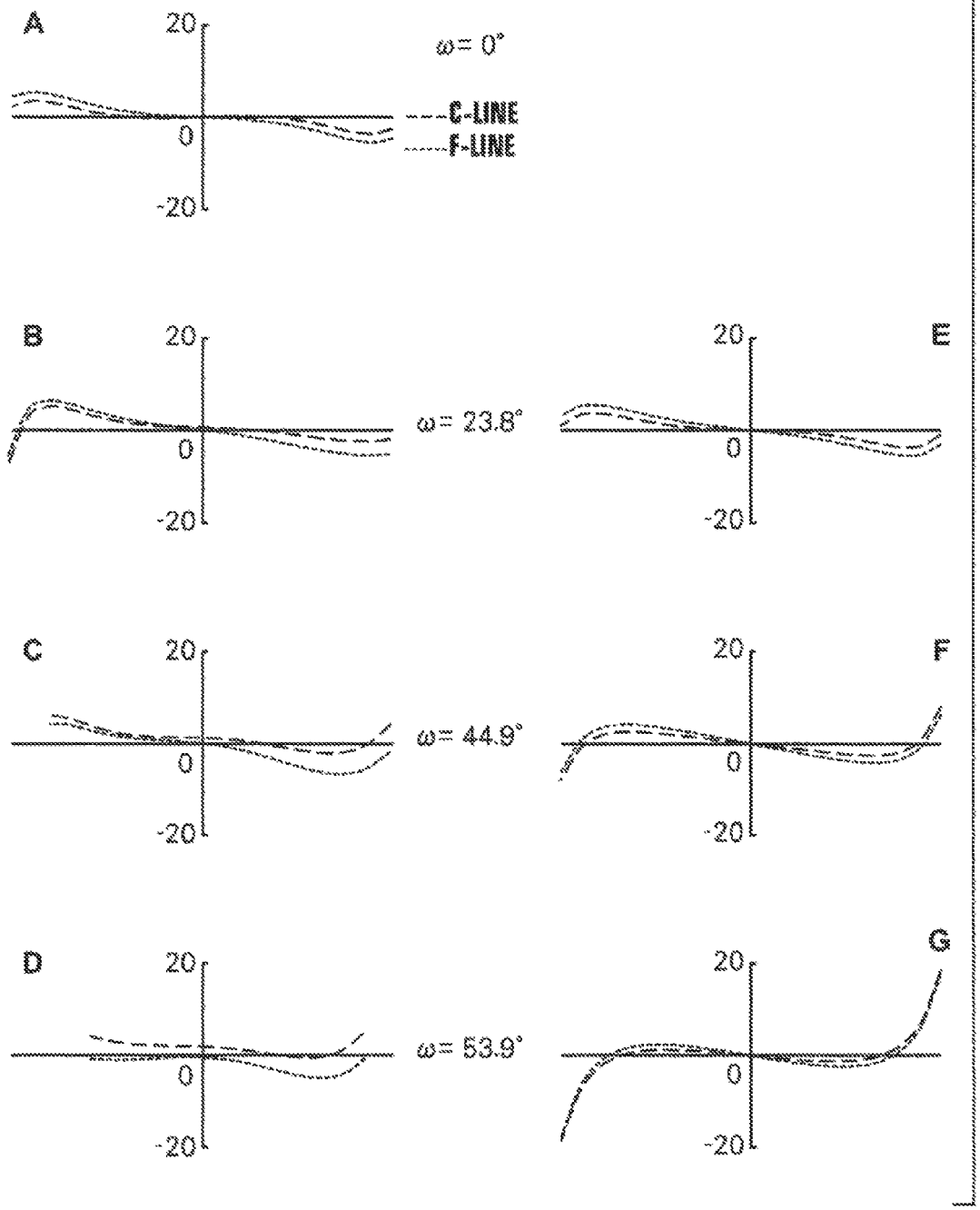
FIG. 15, Sections A through G are lateral aberration curves of the imaging lens in Example 4 of the present invention.
Figure 16:
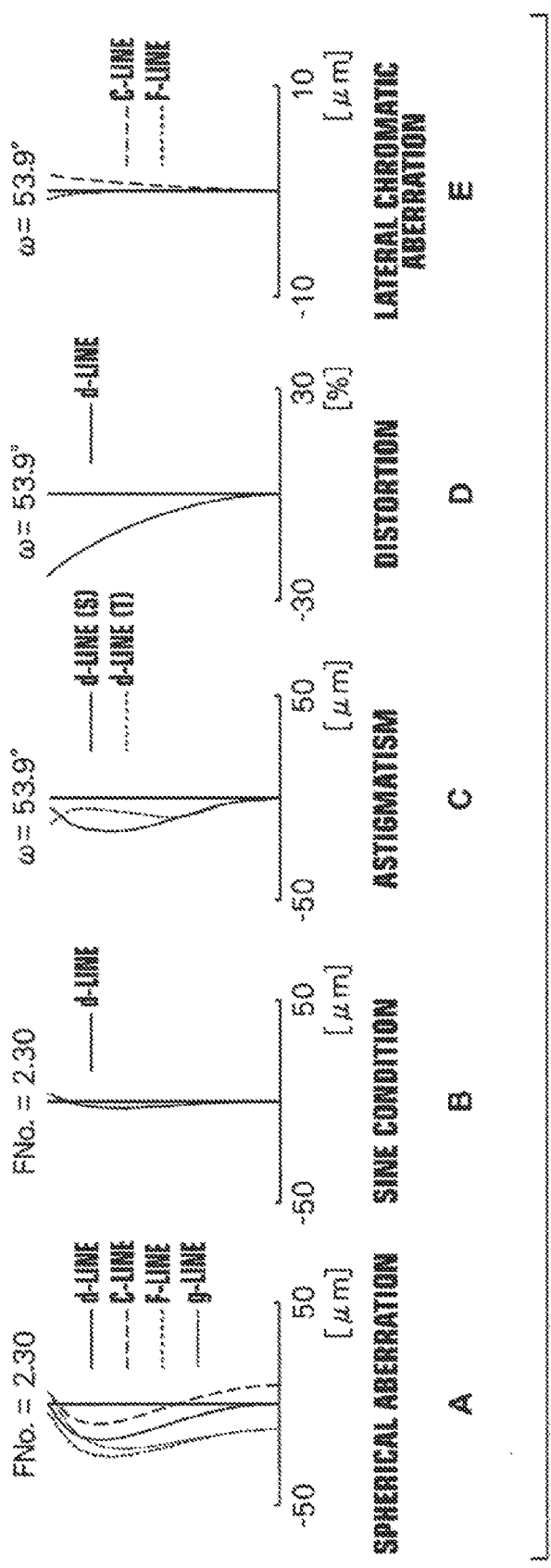
FIG. 16, Sections A through E are aberration diagrams of the imaging lens in Example 5 of the present invention.
Figure 17:
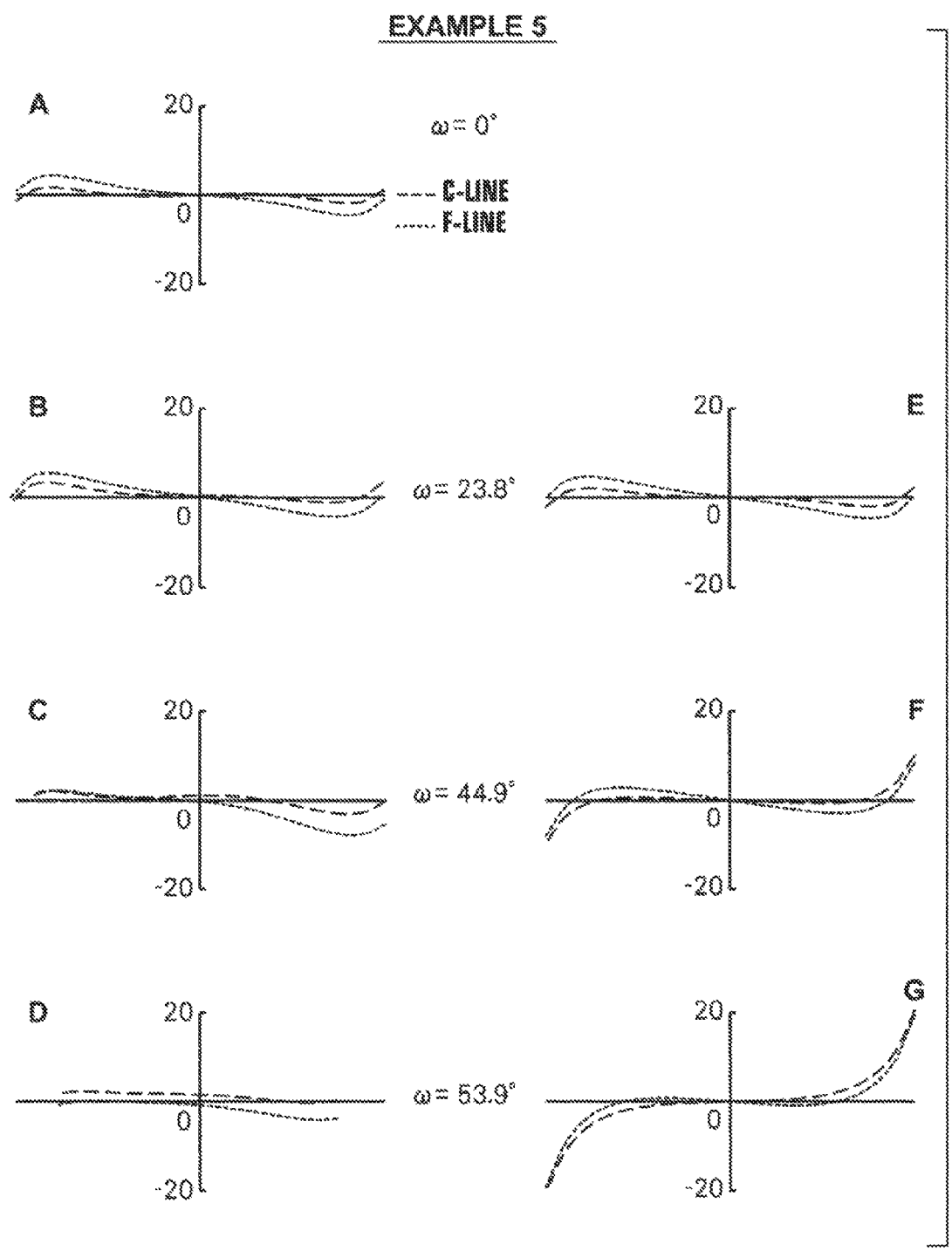
FIG. 17, Sections A through G are lateral aberration curves of the imaging lens in Example 5 of the present invention.
Figure 18:
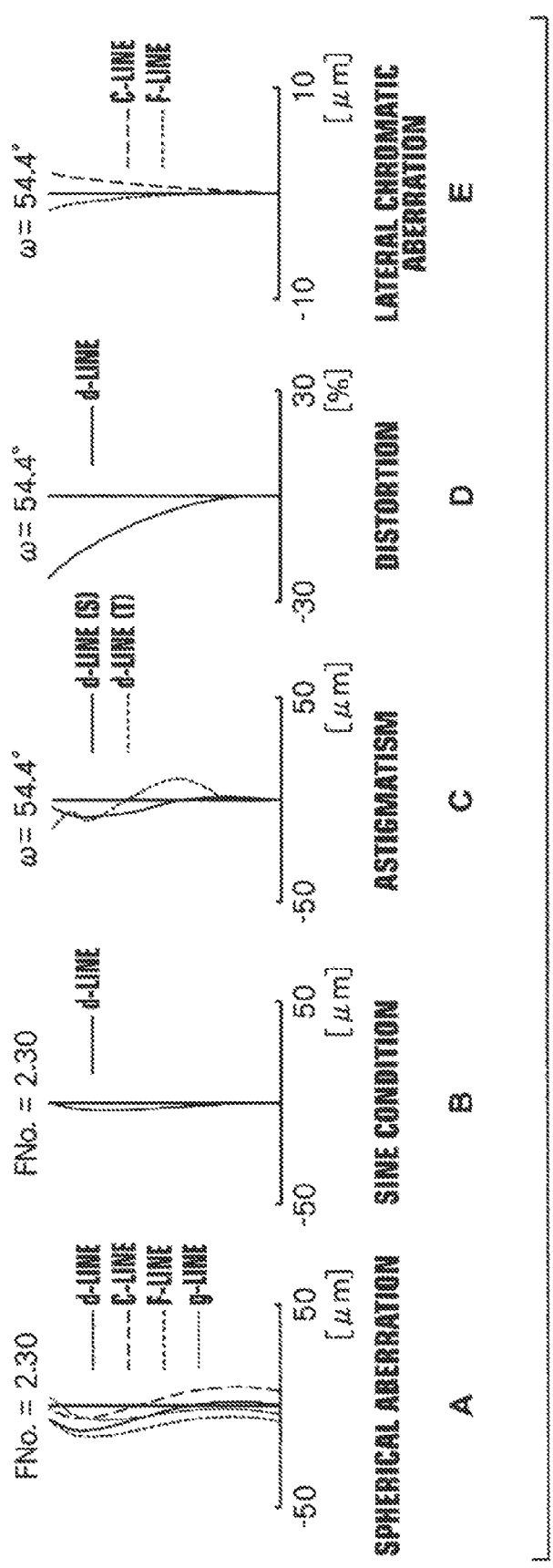
FIG. 18, Sections A through E are aberration diagrams of the imaging lens in Example 6 of the present invention.
Figure 19:
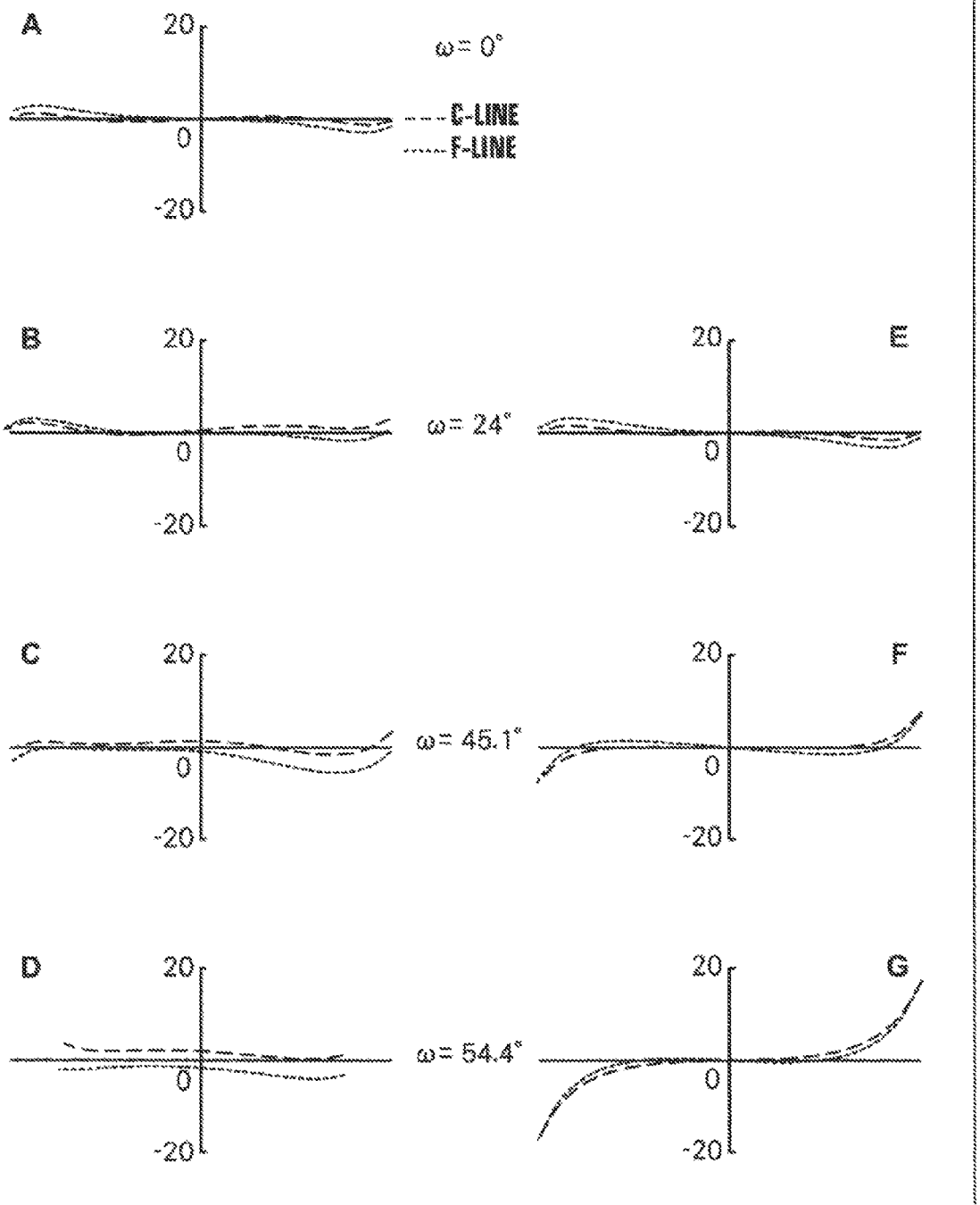
FIG. 19, Sections A through G are lateral aberration curves of the imaging lens in Example 6 of the present invention.
Figure 20:
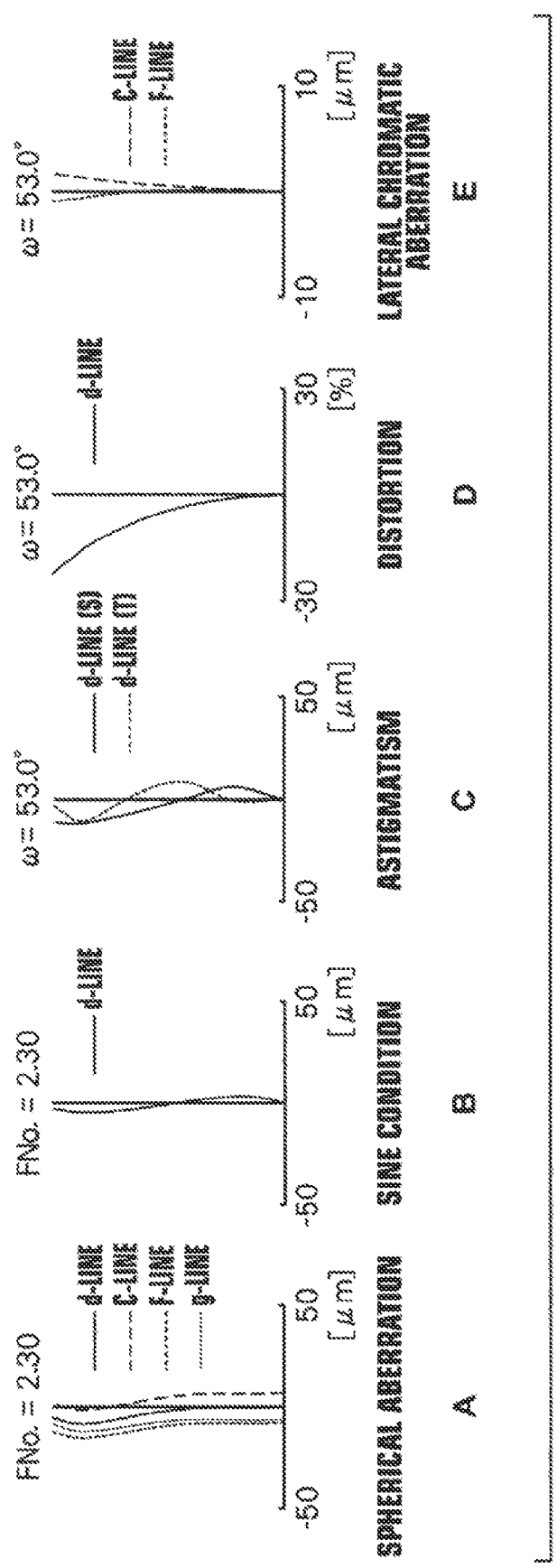
FIG. 20, Sections A through E are aberration diagrams of the imaging lens in Example 7 of the present invention.
Figure 21:
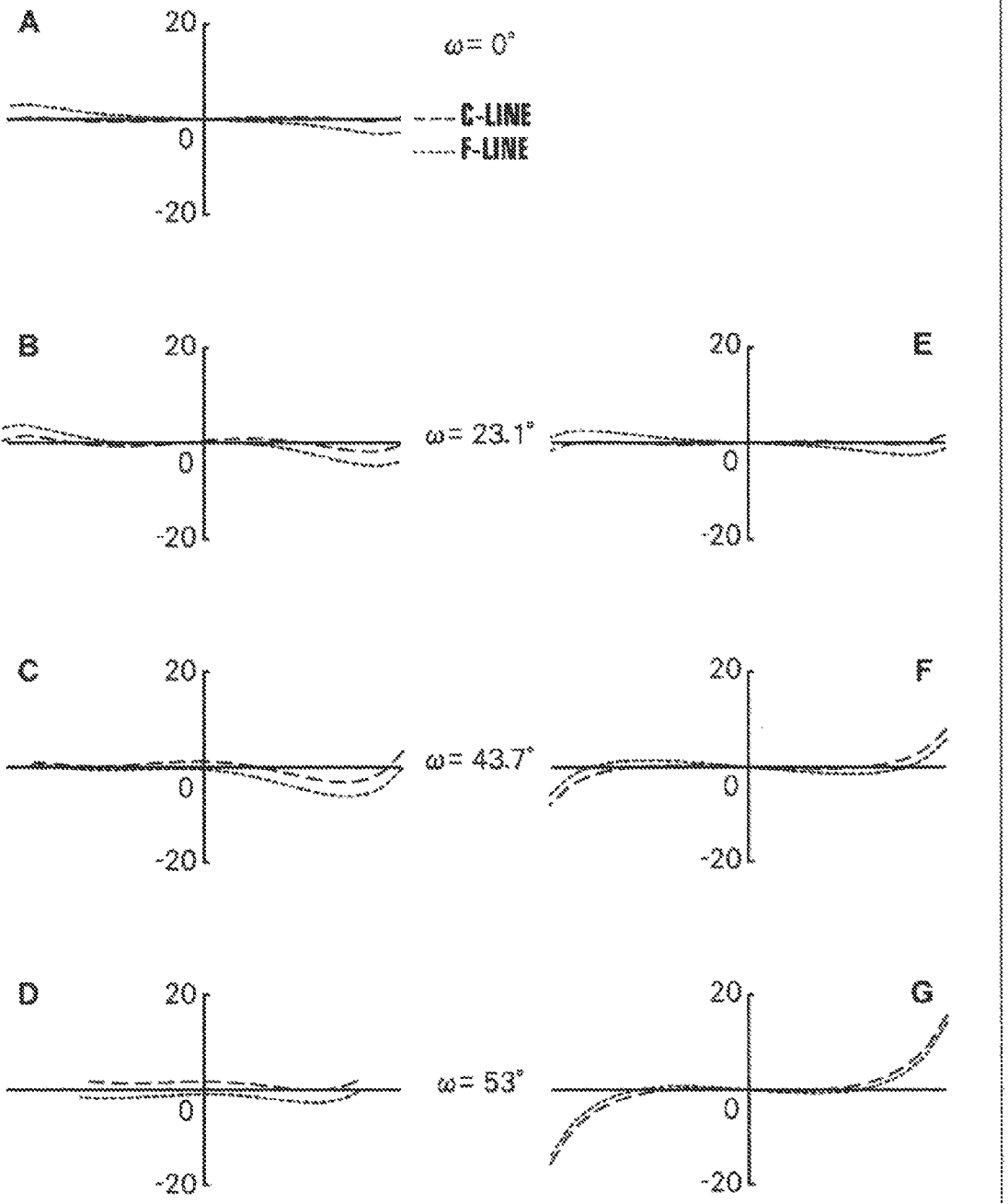
FIG. 21, Sections A through G are lateral aberration curves of the imaging lens in Example 7 of the present invention.

Similarly, FIG. 10, Sections A through E, FIG. 12, Sections A through E, FIG. 14, Sections A through E, FIG. 16, Sections A through E, FIG. 18, Sections A through E, and FIG. 20, Sections A through E illustrate a spherical aberration, an amount of offense against the sine condition, astigmatism, distortion, and a lateral chromatic aberration of the imaging lenses in Examples 2 through 7, respectively. FIG. 11, Sections A through G, FIG. 13, Sections A through G, FIG. 15, Sections A through G, FIG. 17, Sections A through G, FIG. 19, Sections A through G and FIG. 21, Sections A through G illustrate lateral aberration curves of the imaging lenses in Examples 2 through 7, respectively.

As the above numerical value data and the aberration diagrams show, various aberrations are excellently corrected and an imaging lens the size of which, as a whole, is small is realized in each of the examples. Further, in the imaging lenses in Examples 1 through 6, aberrations are excellently corrected not only in a visible range but also in a near-infrared range.

The present invention is not limited to the aforementioned embodiments nor examples, and various modifications are possible. For example, values of a curvature radius, a distance between surfaces, a refractive index and the like of each lens element are not limited to the values shown in the above examples of numerical values, but may be other values.

What is claimed is:

1. An imaging lens consisting essentially of:
a front group consisting of a first lens having a negative meniscus shape with its convex surface facing an object side, a second lens having negative refractive power, a third lens having positive refractive power, a fourth lens having a negative meniscus shape with its concave surface facing an image side and a fifth lens having positive refractive power, and the front group having positive refractive power as a whole;
a stop; and
a rear group consisting of a sixth lens having positive refractive power and a seventh lens having a negative meniscus shape with its concave surface facing the object side, and the rear group having positive refractive power as a whole, in this order from the object side,
wherein the following conditional formula (1) is satisfied:

$$0.6<|f12|/f<1.5 \qquad (1),$$ where f12: a combined focal length of the first lens and the second lens, and
f: a focal length of an entire system.

2. The imaging lens, as defined in claim 1, wherein the following conditional formula (1-1) is satisfied:

$$0.7<|f12|/f<1.3 \qquad (1\text{-}1),$$ where f12: a combined focal length of the first lens and the second lens, and
f: a focal length of an entire system.

3. The imaging lens, as defined in claim 1, wherein the following conditional formula (1-2) is satisfied:

$$0.8<|f12|/f<1.2 \qquad (1\text{-}2),$$ where f12: a combined focal length of the first lens and the second lens, and
f: a focal length of an entire system.

4. The imaging lens, as defined in claim 1, wherein the following conditional formula (2) is satisfied:

$$1.3<fa/f<1.9 \qquad (2),$$ where fa: a focal length of the front group, and
f: a focal length of an entire system.

5. The imaging lens, as defined in claim 1,
wherein the following conditional formula (2-1) is satisfied:

$$1.4<fa/f<1.8 \qquad (2\text{-}1),$$ where fa: a focal length of the front group, and
f: a focal length of an entire system.

6. The imaging lens, as defined in claim 1, wherein the following conditional formula (3) is satisfied:

$$0.5<fa/f5<1.4 \qquad (3),$$ where fa: a focal length of the front group, and
f5: a focal length of the fifth lens.

7. The imaging lens, as defined in claim 1, wherein the following conditional formula (3-1) is satisfied:

$$0.7<fa/f5<1.3 \qquad (3\text{-}1),$$ where fa: a focal length of the front group, and
f5: a focal length of the fifth lens.

8. The imaging lens, as defined in claim 1, wherein the following conditional formula (3-2) is satisfied:

$$0.8 < fa/f5 < 1.2 \quad (3\text{-}2), \text{ where}$$

fa: a focal length of the front group, and
f5: a focal length of the fifth lens.

9. The imaging lens, as defined in claim 1, wherein the following conditional formula (4) is satisfied:

$$vd3 < 26.0 \quad (4), \text{ where}$$

vd3: an Abbe number of the third lens for d-line.

10. The imaging lens, as defined in claim 1, wherein the following conditional formula (4-1) is satisfied:

$$vd3 < 23.0 \quad (4\text{-}1), \text{ where}$$

vd3: an Abbe number of the third lens for d-line.

11. The imaging lens, as defined in claim 1, wherein the following conditional formula (5) is satisfied:

$$3.5 < L/Rr1 < 9.0 \quad (5), \text{ where}$$

L: a length from a vertex of an object-side surface of the first lens to a paraxial image formation position determined by the first lens through the seventh lens, and
Rr1: a paraxial curvature radius of an image-side surface of the first lens.

12. The imaging lens, as defined in claim 1, wherein the following conditional formula (5-1) is satisfied:

$$4.0 < L/Rr1 < 7.0 \quad (5\text{-}1), \text{ where}$$

L: a length from a vertex of an object-side surface of the first lens to a paraxial image formation position determined by the first lens through the seventh lens, and
Rr1: a paraxial curvature radius of an image-side surface of the first lens.

13. The imaging lens, as defined in claim 1, wherein the following conditional formula (6) is satisfied:

$$3.5 < L/Rr2 < 10.0 \quad (6), \text{ where}$$

L: a length from a vertex of an object-side surface of the first lens to a paraxial image formation position determined by the first lens through the seventh lens, and
Rr2: a paraxial curvature radius of an image-side surface of the second lens.

14. The imaging lens, as defined in claim 1, wherein the following conditional formula (6-1) is satisfied:

$$4.5 < L/Rr2 < 9.0 \quad (6\text{-}1), \text{ where}$$

L: a length from a vertex of an object-side surface of the first lens to a paraxial image formation position determined by the first lens through the seventh lens, and
Rr2: a paraxial curvature radius of an image-side surface of the second lens.

15. The imaging lens, as defined in claim 1, wherein the following conditional formula (7) is satisfied:

$$0.4 < f5/f6 < 1 \quad (7), \text{ where}$$

f5: a focal length of the fifth lens, and
f6: a focal length of the sixth lens.

16. The imaging lens, as defined in claim 1, wherein the following conditional formula (7-1) is satisfied:

$$0.55 < f5/f6 < 0.85 \quad (7\text{-}1) \text{ where}$$

f5: a focal length of the fifth lens, and
f6: a focal length of the sixth lens.

17. An imaging apparatus comprising:
the imaging lens, as defined in claim 1, mounted thereon.

* * * * *